United States Patent
Bosshart

(10) Patent No.: US 6,910,123 B1
(45) Date of Patent: Jun. 21, 2005

(54) PROCESSOR WITH CONDITIONAL INSTRUCTION EXECUTION BASED UPON STATE OF CORRESPONDING ANNUL BIT OF ANNUL CODE

(75) Inventor: Patrick W. Bosshart, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 574 days.

(21) Appl. No.: 09/713,441

(22) Filed: Nov. 15, 2000

Related U.S. Application Data
(60) Provisional application No. 60/175,884, filed on Jan. 13, 2000.

(51) Int. Cl.$^7$ ................................................ G06F 9/00
(52) U.S. Cl. ........................................................ 712/226
(58) Field of Search ................................ 712/226, 241, 712/235

(56) References Cited

U.S. PATENT DOCUMENTS

| | | | | | |
|---|---|---|---|---|---|
| 3,638,195 A | * | 1/1972 | Brender et al. | ............. | 709/212 |
| 4,439,827 A | * | 3/1984 | Wilkes | ............. | 712/235 |
| 4,566,062 A | * | 1/1986 | Ohnishi et al. | ............. | 712/241 |
| 4,742,451 A | * | 5/1988 | Bruckert et al. | ............. | 712/235 |
| 5,165,025 A | * | 11/1992 | Lass | ............. | 712/235 |
| 5,493,669 A | * | 2/1996 | Denman, Jr. | ............. | 711/133 |
| 5,689,693 A | * | 11/1997 | White | ............. | 712/224 |
| 5,748,935 A | * | 5/1998 | Tremblay et al. | ............. | 712/216 |
| 5,784,603 A | * | 7/1998 | Leung et al. | ............. | 712/234 |
| 5,799,167 A | * | 8/1998 | Lesartre | ............. | 712/218 |
| 5,809,324 A | * | 9/1998 | Yung | ............. | 712/23 |
| 5,812,811 A | * | 9/1998 | Dubey et al. | ............. | 712/216 |
| 5,958,048 A | * | 9/1999 | Babaian et al. | ............. | 712/241 |
| 6,175,910 B1 | * | 1/2001 | Pauporte et al. | ............. | 712/217 |
| 6,512,706 B1 | * | 1/2003 | Arnold et al. | ............. | 365/189.12 |

OTHER PUBLICATIONS

InstantWeb. Online Computing Dictionary. ©1995–1999. http://www.instantweb.com/foldoc/foldoc/cgi?computer30 dictionary Search Terms: interrupt; loop; for loop; repeat loop; white; jump; register.*

The American Heritage® Dictionary of the English Language. Third Edition. ©1992. Search Term: Predicate.*

* cited by examiner

*Primary Examiner*—Eddie Chan
*Assistant Examiner*—Aimee J. Li
(74) *Attorney, Agent, or Firm*—Robert D. Marshall, Jr.; W. James Brady, III; Frederick J. Telecky, Jr.

(57) ABSTRACT

A processor having a changeable architected state. The processor includes an instruction memory for storing instructions. The processor also includes an instruction pipeline, where an instruction which passes entirely through the pipeline alters the architected state. Further, the pipeline comprises circuitry for fetching instructions from the instruction memory into the pipeline. The processor also includes circuitry for storing an annul code corresponding to instructions in the pipeline. Finally, the processor includes circuitry for preventing (FU1 through FU8) one or more selected instructions in the group from altering the architected state in response to the annul code.

8 Claims, 8 Drawing Sheets

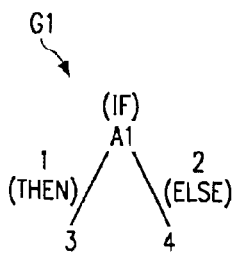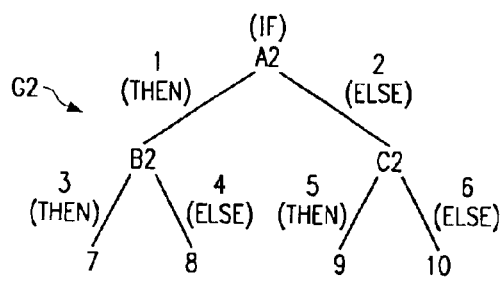

| | AW2 | | AW2 | | AW2 | | AW2 |
|---|---|---|---|---|---|---|---|
| A3 | | A3 | | A3 | | A3 | |
| 1 | 0 | 1 | 0 | 1 | 1 | 1 | 1 |
| 2 | 1 | 2 | 1 | 2 | 0 | 2 | 0 |
| B3 | 0 | B3 | 0 | B3 | 1 | B3 | 1 |
| C3 | 1 | C3 | 1 | C3 | 0 | C3 | 0 |
| 3 | 0 | 3 | 1 | 3 | 1 | 3 | 1 |
| 4 | 1 | 4 | 0 | 4 | 1 | 4 | 1 |
| 5 | 1 | 5 | 1 | 5 | 1 | 5 | 0 |
| 6 | 1 | 6 | 1 | 6 | 0 | 6 | 1 |
| D3 | 0 | D3 | 1 | D3 | 1 | D3 | 1 |
| E3 | 1 | E3 | 0 | E3 | 1 | E3 | 1 |
| F3 | 1 | F3 | 1 | F3 | 1 | F3 | 0 |
| G3 | 1 | G3 | 1 | G3 | 0 | G3 | 1 |
| 7 | 0 | 7 | 1 | 7 | 1 | 7 | 1 |
| 8 | 0 | 8 | 1 | 8 | 1 | 8 | 1 |
| 9 | 1 | 9 | 0 | 9 | 1 | 9 | 1 |
| 10 | 1 | 10 | 0 | 10 | 1 | 10 | 1 |
| 11 | 1 | 11 | 1 | 11 | 1 | 11 | 0 |
| 12 | 1 | 12 | 1 | 12 | 1 | 12 | 0 |
| 13 | 1 | 13 | 1 | 13 | 0 | 13 | 1 |
| 14 | 1 | 14 | 1 | 14 | 0 | 14 | 1 |
| 15 | 0 | 15 | 1 | 15 | 1 | 15 | 1 |
| 16 | 0 | 16 | 1 | 16 | 1 | 16 | 1 |
| 17 | 1 | 17 | 0 | 17 | 1 | 17 | 1 |
| 18 | 1 | 18 | 0 | 18 | 1 | 18 | 1 |
| 19 | 1 | 19 | 1 | 19 | 1 | 19 | 0 |
| 20 | 1 | 20 | 1 | 20 | 1 | 20 | 0 |
| 21 | 1 | 21 | 1 | 21 | 0 | 21 | 1 |
| 22 | 1 | 22 | 1 | 22 | 0 | 22 | 1 |
| (A3, B3) | | (A3, $\overline{B3}$) | | ($\overline{A3}$, $\overline{C3}$) | | ($\overline{A3}$, C3) | |

| FUNCTIONAL UNITS | INSTRUCTIONS | ANNUL (AW1) | |
|---|---|---|---|
| $FU_1$ | 1 | 0 | $P_1$ |
| $FU_5$ | 2 | 1 | |
| $FU_1$ | 3 | 0 | $P_2$ |
| $FU_2$ | B2 | 0 | |
| $FU_5$ | 4 | 0 | |
| $FU_7$ | C2 | 1 | |
| $FU_1$ | 5 | 1 | $P_3$ |
| $FU_2$ | 7 | 0 | |
| $FU_4$ | 9 | 1 | |
| $FU_5$ | 6 | 1 | |
| $FU_6$ | 8 | 0 | |
| $FU_8$ | 10 | 1 | |

| CLOCK CYCLE | | | | |
|---|---|---|---|---|
| 0 | $b1_0$ | $b2_0$ | | |
| 1 | $b1_1$ | $b2_1$ | | |
| 2 | $b1_2$ | $b2_2$ | | |
| 3 | $b1_3$ | $b2_3$ | | |
| 4 | $b1_4$ | $b2_4$ | | |
| 5 | $b1_5$ | $b2_5$ | $b3_0$ | |
| 6 | $b1_6$ | $b2_6$ | $b3_1$ | $b4_0$ |
| 7 | $b1_7$ | $b2_7$ | $b3_2$ | $b4_1$ |
| 8 | $b1_8$ | $b2_8$ | $b3_3$ | $b4_2$ |
| 9 | $b1_9$ | $b2_9$ | $b3_4$ | $b4_3$ |
| 10 | $b1_{10}$ | $b2_{10}$ | $b3_5$ | $b4_4$ |
| 11 | $b1_{11}$ | $b2_{11}$ | $b3_6$ | $b4_5$ |
| ⋮ | ⋮ | ⋮ | ⋮ | ⋮ |
| 127 | $b1_{127}$ | $b2_{127}$ | $b3_{122}$ | $b4_{121}$ |
| 128 | | | $b3_{123}$ | $b4_{122}$ |
| 129 | | | $b3_{124}$ | $b4_{123}$ |
| 130 | | | $b3_{125}$ | $b4_{124}$ |
| 131 | | | $b3_{126}$ | $b4_{125}$ |
| 132 | | | $b3_{127}$ | $b4_{126}$ |
| 133 | | | | $b4_{127}$ |
| 134 | | | | |

FIG. 9

| CLOCK CYCLE | | | | |
|---|---|---|---|---|
| 0 | $b1_0$ | $b2_0$ | $b3_A$ | $b4_A$ |
| 1 | $b1_1$ | $b2_1$ | $b3_A$ | $b4_A$ |
| 2 | $b1_2$ | $b2_2$ | $b3_A$ | $b4_A$ |
| 3 | $b1_3$ | $b2_3$ | $b3_A$ | $b4_A$ |
| 4 | $b1_4$ | $b2_4$ | $b3_A$ | $b4_A$ |
| 5 | $b1_5$ | $b2_5$ | $b3_0$ | $b4_A$ |
| 6 | $b1_6$ | $b2_6$ | $b3_1$ | $b4_0$ |
| 7 | $b1_7$ | $b2_7$ | $b3_2$ | $b4_1$ |
| 8 | $b1_8$ | $b2_8$ | $b3_3$ | $b4_2$ |
| 9 | $b1_9$ | $b2_9$ | $b3_4$ | $b4_3$ |
| 10 | $b1_{10}$ | $b2_{10}$ | $b3_5$ | $b4_4$ |
| 11 | $b1_{11}$ | $b2_{11}$ | $b3_6$ | $b4_5$ |
| ⋮ | ⋮ | ⋮ | ⋮ | ⋮ |
| 127 | $b1_{127}$ | $b2_{127}$ | $b3_{122}$ | $b4_{121}$ |
| 128 | $b1_A$ | $b2_A$ | $b3_{123}$ | $b4_{122}$ |
| 129 | $b1_A$ | $b2_A$ | $b3_{124}$ | $b4_{123}$ |
| 130 | $b1_A$ | $b2_A$ | $b3_{125}$ | $b4_{124}$ |
| 131 | $b1_A$ | $b2_A$ | $b3_{126}$ | $b4_{125}$ |
| 132 | $b1_A$ | $b2_A$ | $b3_{127}$ | $b4_{126}$ |
| 133 | $b1_A$ | $b2_A$ | $b3_A$ | $b4_{127}$ |
| 134 | | | | |

PROCESSOR WITH CONDITIONAL INSTRUCTION EXECUTION BASED UPON STATE OF CORRESPONDING ANNUL BIT OF ANNUL CODE

CROSS-REFERENCES TO RELATED APPLICATIONS

This application claims priority under 35 USC §119(e)(1) of Provisional Application No. 60/175,884, filed Jan. 13, 2000.

STATEMENT REGARDING FEDERALLY SPONSORED RESEARCH OR DEVELOPMENT

Not Applicable.

BACKGROUND OF THE INVENTION

The present embodiments relate to processors, and are more particularly directed to improving branch efficiency in such processors.

The present embodiments pertain to the ever-evolving fields of computer technology, microprocessors, and other types of processors. Processor devices are used in numerous applications, and their prevalence has led to a complex and demanding marketplace where efficiency of operation is often a key consideration, where such efficiency is reflected in both price and performance of the processor. Accordingly, the following discussion and embodiments are directed to one key area of processor efficiency, namely, the large prevalence of branch instructions in computer code.

The branch instruction arises in many contexts, such as from conditional statements in a high-level computer language such as an IF-THEN or IF-THEN-ELSE statement, or other statments providing the same or comparable functionality based on a given high level language. The high level conditional statement is compiled or translated down to a more simple branch instruction at the machine level, such as a jump instruction. In any event, each time a branch instruction is encountered in computer code, it represents a potential of a change in flow in the operation of the processor. Specifically, if the branch condition is met (i.e., if the branch is "taken"), then the resulting flow change may expend numerous processor clock cycles. For example, the current architected state of the processor may have to be saved for later restoration, and the new flow must be initialized, such as by fetching instructions at the location of the new program flow. Further complicating the above consequences is the notion that the branch instruction is generally accepted to occur relatively often in a statistical sense. For example, in contemporary code, a branch instruction may occur on the average of every six instructions. Moreover, approximately two-thirds of such branches are taken. Still further, under current standards, it may be estimated that four clock cycles are required to effect the taken branch. Given these numbers, it is readily appreciated that branch activity can dominate the performance of a computer. Indeed, these types of numbers have motivated various approaches in the art to reduce the impact of branch inefficiencies, including branch prediction approaches as well as branch predication (typically referred to simply as "predication"). An understanding of the latter further introduces the preferred embodiments and, thus, predication is discussed in greater detail below.

In many computers, and particularly superscalar and very large instruction word ("VLIW") computers, compilers attempt to eliminate conditional branches through the use of predicated instructions. Predication is implemented in a processor by including additional hardware, often referred to as a predicate register, where the state of the register is associated with a given instruction. Further, the predicate register provides a condition, or "predicate," which must be satisfied if the associated instruction is to be executed. In other words, prior to execution of each predicated instruction, its associated condition is tested and, if the condition is met, the instruction is executed; to the contrary, if the associated condition is not met, then the instruction is not executed. Given this approach, the number of branch instructions may be reduced by instead predicating certain instructions based on a condition that otherwise would have been evaluated using a branch instruction (or more than one branch instruction).

To further illustrate predication and also as an introduction to a convention to be used later to further demonstrate the preferred embodiments, below is provided a list of pseudo code which represents a typical IF-THEN-ELSE sequence:

```
IF A1
     THEN
              INSTR 1
              INSTR 3
     ELSE
              INSTR 2
              INSTR 4
END
```

As will be evident to one skilled in the art, the above-listed code tests condition A1 and, if it is satisfied (i.e., is true), then the instructions following the "THEN" path (i.e., instructions 1 and 3) are executed to complete the code, whereas if condition A1 is not satisfied (i.e., is false), then the instructions following the "ELSE" path (i.e., instructions 2 and 4) are executed to complete the code.

By way of further introduction, the above-listed pseudo code is illustrated using a tree diagram in FIG. 1a. Turning to FIG. 1a, it illustrates an instruction group G1 forming a single condition tree, where that condition is the result of A1 condition and, thus, the condition A1 is shown at the top of the tree. Further, the instructions to be executed based on the result of the condition are shown as branches of the tree. Particularly, if A1 is true, then the instructions along the branch or path below and to the left of the tree are executed (as shown with the label "THEN"), whereas if A1 is false, then the instructions along the branch or path below and to the right of the tree are executed (as shown with the label "ELSE"). Once the bottom of the tree is reached, the code is complete.

Given the pseudo code above and its tree illustration in FIG. 1a, FIG. 1b illustrates in diagram form the nature in which predication may be applied to that code. Specifically, FIG. 1b illustrates each instruction in the tree as a row entry, shown generally in a box to suggest some type of storage or access to each instruction. Further, each accessible instruction is associated with the condition of A1, where the specific condition is shown in FIG. 1b by placing the condition in the same row entry as the corresponding instruction. For example, the first row in FIG. 1b illustrates the instance where condition A1 is true as associated with instruction 1. As another example, the second row in FIG. 1b illustrates the condition of A1 being false (shown as $\overline{A1}$). Given the association of instruction and corresponding condition of FIG. 1b, prior to each instruction being executed its associated condition is tested and the instruction is executed only if the condition is satisfied. Lastly, note that the illustration of FIG. 1b is for background purposes, and is not intended as an actual representation of the manner in which predication may be achieved in hardware. Indeed, in many contemporary processor architectures it is the case that an entire control word referred to as a predicate field is associated with each instruction; for example, the predicate field may include three bits, where seven of the possible bit combinations of those three bits identify corresponding registers (e.g., general purpose registers) storing different predicates, while the eighth binary combination simply indicates that the present instruction is not predicated.

While predication has reduced the inefficiencies of branch instructions, it also provides various drawbacks. As a first example of a predication drawback, predication is generally not an acceptable solution for long blocks of code. A block of code is defined for this purpose as a group of instructions which are executed sequentially and where there are no branch instructions within the group (although the group may end with a branch instruction). More particularly, in the case of a large block, if each instruction in the block is predicated with the same condition, then the additional resources required to test the predicate for each instruction in the block may easily outweigh the penalty which would occur if the entire block were conditioned at its outset by a single branch instruction. As a result, there is a trade-off between using predication and branch instructions based on the number of instructions in a given block. Typically, the limit of the number of instructions in a group may be empirically determined. For example, in a processor where a branch instruction uses five delay slots and with the branch instruction itself requires six cycles of execution, and further if the processor is superscalar and can execute up to eight instructions per cycle, then it may be useful to predicate instructions for blocks only up to 48 instructions. Stated generally, therefore, predication is more efficient for what may be referred to relatively as short blocks of instructions. Even with this constraint, virtually all modern microprocessors implement some type of predication. As a second example of a predication drawback, many contemporary processors provide up to only a single predicate bit per instruction. Accordingly, such an approach is limited to only a single level condition as in the case of FIG. 1a. However, if an instruction is associated with more than one condition, as will be explored in greater detail later, then the additional conditions cannot be imposed on the instruction using predication and, instead, the instruction must then often be handled using branch instructions which give rise to the inefficiencies described earlier.

In view of the above, the present inventor has recognized the above considerations and drawbacks and below presents improved embodiments wherein the high overhead penalty of branch instructions is considerably reduced.

BRIEF SUMMARY OF THE INVENTION

The preferred embodiment includes a processor having a changeable architected state. The processor includes an instruction memory for storing instructions. The processor also includes an instruction pipeline, where an instruction which passes entirely through the pipeline alters the architected state. Further, the pipeline comprises circuitry for fetching instructions from the instruction memory into the pipeline. The processor also includes circuitry for storing an annul code corresponding to instructions in the pipeline. Finally, the processor includes circuitry for preventing one or more selected instructions in the group from altering the architected state in response to the annul code.

BRIEF DESCRIPTION OF THE SEVERAL VIEWS OF THE DRAWING

FIG. 1a illustrates a tree diagram of an instruction group with a single condition at a single level;

FIG. 1b illustrates the non-conditional instructions of FIG. 1a and predicated by the conditional instruction of FIG. 1a;

FIG. 2a illustrates a tree diagram of an instruction group with a conditions at two levels;

FIG. 2b illustrates the instruction group of FIG. 2a and a corresponding annul word in accordance with a preferred embodiment;

FIG. 2c illustrates the annuls word of FIG. 2b with its values set in the instance where condition A2 is true;

FIG. 2d illustrates the annuls word of FIG. 2b with its values set in the instance where condition A2 is false;

FIG. 5d illustrates the instruction group of FIG. 5a and a corresponding annul word with its values set in the instance where condition A3 is true and condition B3 is true;

FIG. 5e illustrates the instruction group of FIG. 5a and a corresponding annul word with its values set in the instance where condition A3 is true and condition B3 is false;

FIG. 5f illustrates the instruction group of FIG. 5a and a corresponding annul word with its values set in the instance where condition A3 is false and condition C3 is true;

FIG. 5g illustrates the instruction group of FIG. 5a and a corresponding annul word with its values set in the instance where condition A3 is false and condition C3 is false;

FIG. 7 illustrates an instruction stream having three packets of instructions, where each instruction has a corresponding functional unit to which it will be mapped as well as a bit from an annul word to indicate whether the instruction is to be annulled;

FIG. 8 illustrates a prior art example of software pipelining;

FIG. 9 illustrates the application of annul words to greatly reduce the number of instructions required to implement the software pipelining example of FIG. 8.

DETAILED DESCRIPTION OF THE INVENTION

Figure 3A:
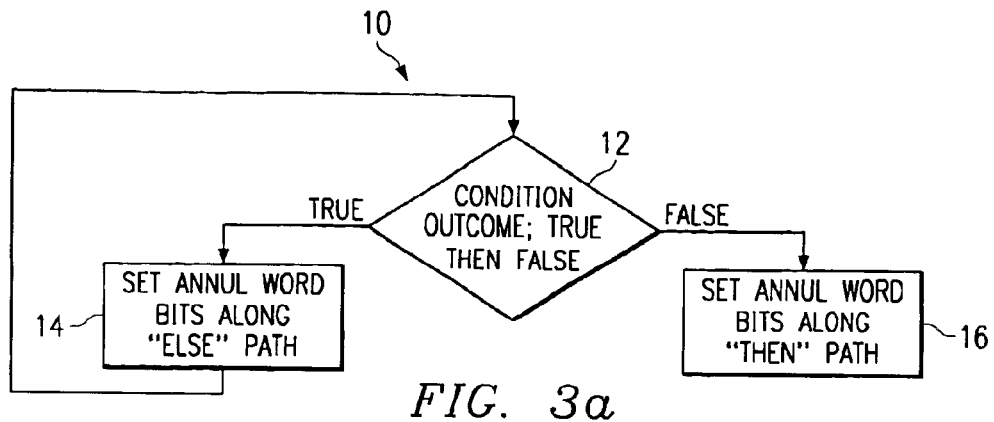
FIG. 3a illustrates a preferred method for setting the states of the elements in the annul word of FIG. 2b, where the states are shown as set in FIGS. 2c and 2d.

FIGS. 1a and 1b were described above in the Background Of The Invention section of this document To demonstrate the preferred embodiments by way of a first example, FIG. 2a illustrates a tree diagram illustrating the logical order of a group of instructions G2, where group G2 includes multiple levels of conditional instructions; more particularly, in the example of FIG. 2a, there are two levels of instructions, where the first level consists of condition A2, while the second level consists of conditions B2 and C2 The remaining structure of the FIG. 2a tree diagram may be readily appreciated given the introduction provided by FIG. 1a, above, and is further illustrated by the following pseudo code which gives rise to the tree diagram of FIG. 2a:

```
IF A2
    THEN
            INSTR 1
            IF B2
                THEN
                        INSTR 3
                        INSTR 7
                ELSE
                        INSTR 4
                        INSTR 8
    ELSE
            INSTR 2
            IF C2
                THEN
                        INSTR 5
                        INSTR 9
                ELSE
                        INSTR 6
                        INSTR 10
END
```

The above code tests at the first level condition A2 to determine if it is true. If condition A1 is satisfied, then the flow is directed to instruction 1 and then proceeds to a condition B2 at the second level. If condition A2 is not satisfied, then the flow is directed to instruction 2 and the flow proceeds to a condition C2 at the second level. In addition, following each of conditions B2 and C2 at the second level, the flow will continue to the instructions shown in the tree diagram below and to the left of a given condition if it is met, or to the instructions below and to the right of a given condition if it is not met. For example with respect to condition B2, if it is met, the flow proceeds with instructions 3 and 7, whereas if condition B2 is not met, the flow proceeds with instructions 4 and 8. The remaining possibilities will be ascertainable by one skilled in the art. Finally, note that the two different levels of group G2 prevent it from being completely processed by a one bit predication system as described earlier in connection with the prior art. In other words, in a one bit predication system, if condition A1 is tested and used to establish a predicate bit, then conditions B2 and C2 still must be tested.

FIG. 2b illustrates a logical depiction of a first aspect of the preferred embodiment More particularly, FIG. 2b first illustrates the instructions of group G2 as also shown in the tree diagram of FIG. 2a, where it should be understood that these instructions may be represented in various manners in a processor according to various different implementations of the present embodiments. For example, such instructions may be pending in a pipeline or stored in a register file or the like. In any event, the preferred method as described below assumes access to some type of stored representation of instructions forming at least a two level conditional tree such as that shown in FIG. 2a.

Also illustrated in FIG. 2b is an additional storage device, which for reasons more clear below is referred to in this document as an annul word. In the preferred embodiment an annul word includes binary elements corresponding to instructions in a given instruction group. For example, in the illustration of FIG. 2b, an annul word AW1 is shown with N elements identified $E1_1$ through $E1_N$, where the "1" in the E1 indicator is used to associate the element with annul word AW1 and the subscript simply increments from one end of the word to the other. Each of elements $E1_1$ through $E1_N$ corresponds to an instruction in group G2 along the same row in FIG. 2b. Note also in this regard that a condition is considered a type of instruction and, therefore, each condition also has an associated element in annul word AW1. In all events, as examples of this alignment element $E1_0$ corresponds to instruction 1, element $E1_1$ corresponds to instruction 2, element $E1_2$ corresponds to instruction (and condition) B2, and element $E1_{11}$ corresponds to instruction 10. Further and as explained later, note that no element corresponds to the instruction at the top of group G2 (i.e., instruction A2). Finally, given the discussion thus far and the additional detail in the remainder of this document, one skilled in the art will appreciate that an annul word may be performed using various storage or state devices, where a register may be used by way of an example.

FIG. 3a illustrates a simplified flow chart of a method 10 in accordance with the preferred embodiment where method 10 is preferably performed by a compiler and sets the states of annul word AW1 from FIG. 2b; indeed and as detailed later, in the preferred embodiment method 10 is repeated to form two different annul words which are complements of one another. To appreciate method 10, its steps are first explored followed by some examples of its application in the context of instruction group G2. Method 10 begins with a step 12 that assumes a condition outcome in an instruction group, where the first condition analyzed is that which is at the top of the group. For example with respect to group G2, method 10 begins with condition A2. In the first instance of step 12, condition A2 is assumed to be true and method 10 continues to step 14 which, for a first annul word, sets the annul word bits for each instruction along the "ELSE" path of the instruction group. After step 14, the flow returns to step 12 at which point the condition (e.g., A2) is assumed to be false. In response to the false assumption, method 10 continues to step 16 which, for a second annul word, sets the annul word bits for each instruction along the "THEN" path of the instruction group. Each of the alternatives provided by steps 14 and 16 is further explored below. Before reaching those alternatives, note by way of introduction to another aspect of the preferred embodiment that once a bit is set in the annul word, then the instruction corresponding to the set bit is later annulled, that is, it is suppressed so that the instruction does not alter the architected state of the processor. The annulment may be achieved in various manners as also further addressed later. Finally, note that to the extent that specific circuitry is not described in this document, method 10 may be implemented by various circuits and operations as may be ascertained by one skilled in the art and may be a part of various different types of processors.

FIG. 2c again illustrates instruction group G2 and annul word AW1 of FIG. 2b, but now further illustrates the states of the binary elements as set according to method 10 when condition A2 is assumed to be true. Specifically, if condition A2 is assumed to be true, then in step 14 the compiler sets the bits in annul word AW1 corresponding to each instruction along the "ELSE" path of instruction group G2; from the tree diagram of FIG. 2a, it may be confirmed that the instructions along the ELSE path are instructions 2, C2, 5,6,9, and 10. Accordingly, in FIG. 2c, note that elements $E1_2$, $E1_4$, $E1_7$, $E1_8$, $E1_{11}$, and $E1_{12}$ are set since they correspond to instructions 2, C2, 5, 6, 9, and 10. Given the states of the bits in annul word AW1 of FIG. 2c, then in the preferred embodiment instructions 2, C2, 5, 6, 9, and 10 are not permitted to alter the architected state of the processor. Indeed, as shown in the preferred embodiment later, these instructions are not permitted to execute. Moreover, as also appreciated later, the operation provided by the preferred embodiment as an alternative to branch instructions avoids the delays and unpredictability associated with branch operation, and also does not complicate or prohibit the scheduling of instructions following a branch instruction as is often the case when branching is used. Still further, therefore, note that condition C2 is one of the suppressed instructions and, as a condition, it is not tested. Thus, there is a reduced processor burden as compared to a one bit predication system as described earlier.

FIG. 2d again illustrates instruction group G2 and annul word AW1 of FIG. 2b, but FIG. 2d illustrates the states of the binary elements as set by the compiler according to method 10 when condition A2 is assumed to false. Specifically, if condition A2 is assumed to be false, then step 16 sets the bits in annul word AW1 corresponding to each instruction along the "THEN" path of instruction group G2; from the tree diagram of FIG. 2a, it may be confirmed that the instructions along the THEN path are instructions 1, B2, 3, 4, 7, and 8. Accordingly, in FIG. 2d, note that elements $E1_1$, $E1_3$, $E_5$, $E1_6$, $E1_9$, and $E_{10}$ are set since they correspond to instructions 1, B2, 3, 4, 7, and 8. Given the states of the bits in annul word AW1 of FIG. 2d, then in the preferred embodiment instructions 1, B2, 3, 4, 7, and 8 are not permitted to alter the architected state of the processor. Further, because these instructions are preferably not executed by the processor, and because these non-executed instructions include the complexities arising from testing and responding to condition B2 which is not tested, then the delays and complexities of testing and responding to a branch instruction are not incurred.

Figure 3B:
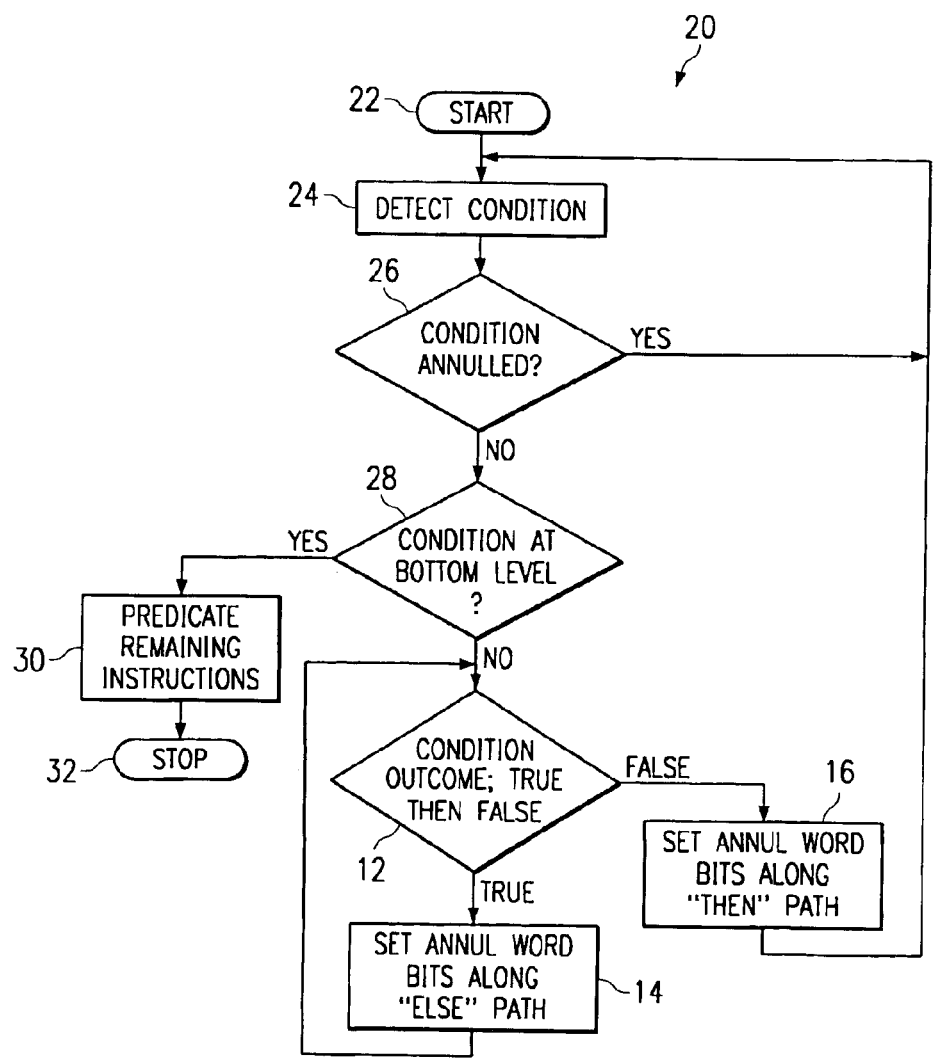
FIG. 3b illustrates a method in accordance with the preferred embodiment for processing an instruction group with two or more condition levels and for setting the states of the elements in a correspond annul word.

FIG. 3b illustrates a flow chart of a method 20 in accordance with the preferred embodiment where method 20 is preferably performed by a compiler, and which as demonstrated below includes the steps of method 10 of FIG. 3a and again operates to determine the bit states for various annul words. Method 20 begins with a start step 22 which simply depicts the examination of a flow of instructions, where the instructions may be perceived by way of example as instruction group G2. Step 24 is reached when an instruction in the sequence is detected to be a condition. In response, method 20 continues to step 26, which determines whether the condition detected in step 24 is already annulled in the given annul word being established, that is, whether the condition corresponds to a set bit in that annul word; if the detected condition has been annulled, then method 20 returns to step 22 after which another condition may be detected, whereas if the detected condition has not been annulled, then method 20 continues to step 28.

Figures 4A, 4B, 5A, 5B, 5C:
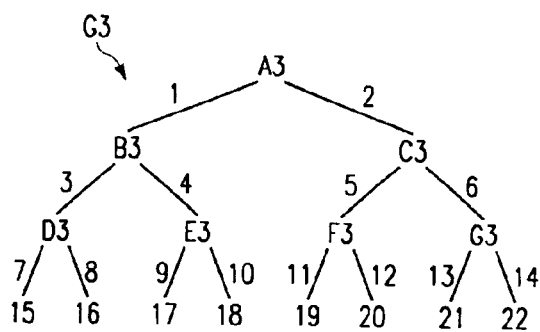
FIG. 4a illustrates the predication step of the preferred embodiment taken with respect to the instruction tree in FIG. 2a when condition A2 is true.
FIG. 4b illustrates the predication step of the preferred embodiment taken with respect to the instruction tree in FIG. 2a when condition A2 is false.
FIG. 5a illustrates a tree diagram of an instruction group with a conditions at three levels.
FIG. 5b illustrates the instruction group of FIG. 5a and a corresponding annul word with its values set in the instance where condition A3 is true.
FIG. 5c illustrates the instruction group of FIG. 5a and a corresponding annul word with its values set in the instance where condition A3 is false.

Step 28 determines whether the condition detected in step 24 is at a bottom level for the given instruction tree. If the detected instruction is at the bottom of the tree, method 20 continues to step 30 whereas if the detected instruction is not at the bottom of the tree, method 20 continues to step 12. Returning briefly to FIG. 2a, the operation of step 28 may be shown by way of example. Specifically, step 28 determines, for an instruction having been reached and not annulled (as will be excluded by step 26), that either of instruction B2 or C2 are at the bottom of the instruction tree. As a result, for such an instruction, method 20 continues to step 30, and step 30 predicates the instruction where the predication is in the same manner as the prior art. To further illustrate this operation, FIGS. 4a and 4b illustrate in diagram form the nature in which predication may be applied to these instructions, where such a form may be embodied using a predicate register or the like. Briefly looking at these Figures, FIG. 4a illustrates the predicate formation for instruction B2 while FIG. 4b illustrates the predicate formation for instruction C2. In FIG. 4a, therefore, it is demonstrated that if instruction B2, as a condition, tests true, then instructions 3 and 7 are to be executed, whereas if instruction B2 tests false, then instructions 4 and 8 are to be executed. Similarly in FIG. 4b, it demonstrates that if instruction C2, as a condition, tests true, then instructions 5 and 9 are to be executed, whereas if instruction C2 tests false, then instructions 6 and 10 are to be executed. Each of the indications of FIGS. 4a and 4b may be readily confirmed from the tree structure of FIG. 2a.

To further demonstrate the preceding, an example is now traced through the steps of method 20. Method 20 begins by processing instructions in group G2 with step 22, and detects condition A2 at step 24. Step 26 evaluates whether condition A2 has been annulled; at this point, however, no annulling has taken place with respect to group G2 and, thus, the flow continues to step 28. Next, step 28 determines whether condition A2 is at the bottom of the tree and, since it is not, the flow continues to step 12. Step 12 first assumes that the outcome of condition A2 is true and, accordingly, the flow continues to step 14 to set the bit states in a first annul word so that those bits along the "ELSE" path are set to one; in other words, therefore, step 14 sets the elements to appear as they are shown in FIG. 2c. Next, the flow returns again to step 12 which next assumes that condition A2 is false. In response, method 20 continues to step 16 which, for a second annul word, sets the annul word bits for each instruction along the "THEN" path of the instruction group; in other words, therefore, step 16 sets the elements to appear as they are shown in FIG. 2d. Each of the alternatives provided by steps 14 and 16 is further explored below, and in any event once step 16 is complete the flow returns to step 22, as also further explored below.

After processing condition A2 and returning to step 22, step 24 detects condition B2 and proceeds to step 26 which evaluates whether the detected condition (i.e., B2) is annulled for a given annul word being formed. For example, assume that annul word AW1 in FIG. 2d illustrates the current word being formed. Accordingly, it may be seen in FIG. 2d that indeed condition B2 is annulled as indicated by the set state of element $E1_3$. As a result, the flow continues from step 26 back to step 22, and proceeds still further as explored below.

Step 22 continues the process after having already detected conditions A2 and B2, and step 24 is next reached when condition C2 is detected. Next, step 26 examines whether condition C2 is annulled, and again given that the present example is reflected by annul word AW1 in FIG. 2d, the cleared state of element $E1_4$ indicates that condition C2 is not annulled. As a result, method 20 continues to step 28. Step 28 determines that condition C2 is a bottom level condition and passes the flow to step 30, which predicates the instructions that follow condition C2 in the tree. Accordingly, step 30 creates the predicate information illustrated in FIG. 4b, and method 20 concludes with a stop step 32. Lastly, while not expressly shown in FIG. 3b, one skilled in the art should appreciate that in the preferred embodiment method 20 repeats to form each different possible annul word based on the possible outcomes (i.e., either true or false) for all conditions which are not at the bottom level of the tree.

While the preferred embodiment has now been illustrated as applied to the two level instruction group G2 of FIG. 2a, it should be appreciated that it also applies to instruction groups with more than two levels. To further illustrate this aspect, FIG. 5a illustrates a tree diagram illustrating the logical order of a group of instructions G3, where group G3 includes three levels of conditional instructions. Given the earlier-provided discussion, a detailed statement regarding each instruction in group G3 is not necessary as one skilled in the art should appreciate the sequence as demonstrated in FIG. 5a. Briefly, therefore, group G3 begins with a first level condition A3, and below it is a second level set of conditions B3 and C3, below which is a third level set of conditions D3, E3, F3, and G3. As with the earlier tree convention in this document, if a condition is assumed to be satisfied then the flow continues to the bottom left of the condition whereas if the condition is not satisfied then the flow continues to the bottom right of the condition.

To further illustrate the use of an annul word according to the preferred embodiment, FIGS. 5b through 5g illustrate the values in an annul word AW2 which are set by method 20 in response to different findings with respect to the tested conditions of FIG. 5a. A few of these Figures are now explored in detail, from which one skilled in the art should readily appreciate the comparable results in the remaining Figures.

FIG. 5b illustrates instruction group G3 along with its corresponding annul word as set by method 20 when condition A3 is assumed to be true. More particularly, when method 20 operates with respect to group G3, step 24 detects condition A3, and since it is not annulled then step 26 passes the flow to step 28 which advances the flow to step 12 because instruction A3 is not a bottom level instruction. Step 12 assumes that condition A3 is true (in the example of FIG. 5b), and next therefore step 14 sets each element in annul word AW2 corresponding to the "ELSE" path of group G3. Thus, with respect to FIG. 5a, step 14 sets each element in annul word AW2 corresponding to an instruction along the path below and to the right of condition A3, and from FIG. 5b it will be shown that these set elements correspond to instructions 2, C3, 5, 6, F3, G3, 11, 12, 13, 14, 19, 20, 21, and 22. These set bits will eventually cause these instructions to be annulled, and note that the annulled instructions include three conditions (i.e., C3, F3, and G3). Since these conditions are annulled then there is no additional processor burden required for testing these conditions and acting in response to the test. Lastly, FIG. 5c illustrates instruction group G3 along with its corresponding annul word as set by method 20 when condition A3 is assumed to be false and, from the preceding, one skilled in the art should appreciate that its annul word states are complementary to those shown in FIG. 5b, thereby annulling the instructions along the path below and to the left of condition A3.

FIG. 5d illustrates instruction group G3 along with its corresponding annul word as set by method 20 when condition A3 is assumed to be true and condition B3 is also assumed to be true. Specifically, recall that method 20, after a first instance of either step 14 or 16, returns to process the next condition. Thus, for the example of FIG. 5d when condition A3 is first assumed to be true, then the next instance of step 24 detects condition B3. Next, step 26 determines whether condition B3 is annulled, and this determination is made by referring to annul word AW2 of FIG. 5b which corresponds to the present example where condition A3 is assumed to be true; from this analysis, it is determined that condition B3 is not annulled and, thus, step 26 passes the flow to step 28. Since condition B3 is not a bottom level condition, then step 28 passes the flow to step 12. In the example of FIG. 5b, condition B3 is also assumed to be true, so the operation of step 12 passes the flow again to step 14, which now sets the bits in annul word AW2 with respect to the instructions below condition B3. Thus, in addition to those bits that were set earlier when condition A3 was processed, and given that step 14 is now operating with respect to condition B3 which is assumed to be true, then step 14 sets the bits in annul word AW2 corresponding to those instructions along the path below and to the right of condition B3. Accordingly, FIG. 5d illustrates that, in addition to the same set bits as shown for condition A3 being true from FIG. 5b, the bits corresponding to instructions 4, E3, 9, 10, 17, and 18 are also set.

Having presented the above examples, one skilled in the art may readily trace though and confirm the remaining bit illustrations for FIGS. 5e through 5g, where each such Figure illustrates a different application of method 20 given the assumptions taken by step 12. In this regard, these remaining Figures illustrate the following: (1) FIG. 5e illustrates the values of annul word AW2 when condition A3 is assumed to be true and condition B3 is assumed to be false; (3) FIG. 5f illustrates the values of annul word AW2 when condition A3 is assumed to be false and condition C3 is assumed to be true; and (4) FIG. 5g illustrates the values of annul word AW2 when condition A3 is assumed to be false and condition C3 is assumed to be false. In each of these examples, therefore, and as well as in FIG. 5b, note that by time the second level condition is processed by method 20, a total of 20 of the total instructions in group G3 are annulled. Thus, these instructions may pass through a portion of the processor pipeline, but they do not have the inefficiencies associated with them as would be the case if branch instructions were instead used to implement the tree. Finally, one skilled in the art should also appreciate that based on the true or false values of the upper level conditions (i.e., A3, B3, and C3), ultimately method 20 will converge on a selected one of the four lowest level conditions and predicate the remaining instructions below that selected condition. As a result, there is additional processing efficiency obtained with respect to the instruction(s) following the lowest level condition.

Figure 6A:
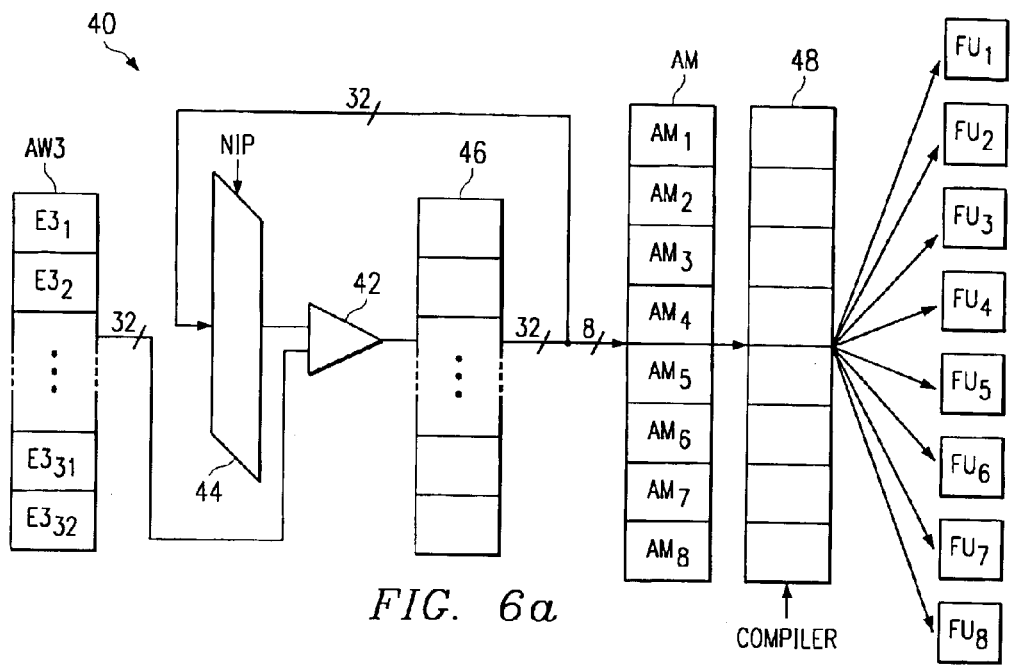
FIG. 6a illustrates an electrical functional diagram of the preferred embodiment for using bits from the annul word to generate an annul mask used to prevent execution of instructions identified to be annulled.

Having detailed the preferred embodiment for establishing an annul word, attention is now directed to the use of the annul word bits to suppress the instruction(s) designated by that word so that the suppressed or "annulled" instructions do not change the architected state of the processor, as is now explored first in connection with FIG. 6a. By way of introduction, FIG. 6a illustrates a diagram of an instruction suppression system 40. System 40 may be implemented using various different circuits, while FIG. 6a therefore demonstrates the logical functionality that is desirable in the preferred embodiment. Moreover, as noted earlier with respect to the preferred methodology of detecting conditions and setting states in an annul word, system 40 may be implemented in various different types of processors.

Turning now to the details of system 40, it includes an annul word, which to distinguish from earlier examples is designated as AW3. In the preferred embodiment, annul word AW3 includes a sufficient number of bit elements to accommodate a desirable number of instructions in the instruction sequence. For example, under current architectures, a desirable size may be 32 instructions and, thus, as shown in FIG. 6a, annul word AW3 includes 32 bit elements $E3_1$ through $E3_{32}$. The states of annul word AW3 are connected to a first data input of a buffer 42 which has a second input connected to the output of a shift register 44. Shift register 44 has a shift capability equal in size to the number of bits stored by annul word AW3 and, hence, in the current example, shift register 44 is a 32-bit shift register. The shift control input of shift register 44 receives a control signal designated NIP, which is an abbreviation for number of instructions in packet, as will be detailed later. The output of buffer 42 provides a bit group 46. In this regard, note that bit group 46 is referred to in this manner so as to indicate that certain bits, as detailed below, are used from the output of buffer 42, but these bits need not be stored in yet another separate device which could otherwise complicate the design and add delay. The number of bits in bit group 46 is the same number of bits which are in annul word AW3 (i.e., 32 in the present case). The 32 bits of bit group 46 are coupled in a manner such that they are fed back to a an input of shift register 44, and also such that an integer number M of the least significant of these 32 bits are used as an annul mask AM. Annul mask AM also represents a group of bits rather than a separate hardware device, but for sake of illustration these M bits are shown in FIG. 6a as $AM_1$ through $AM_M$. Finally, the bits of annul mask AM are coupled to a functional unit use map 48 which, as detailed below, is written by the compiler to map one or more bits from annul mask AM to the appropriate one of the eight functional units $FU_1$ through $FU_8$.

Before discussing the operation of system 40, note that the processor in which it is implemented is also understood to have the integer M number of functional units. A functional unit may be one of various different types of devices, where typically in the art it is these units that are said to "execute" a corresponding instruction. Also in this regard, it is often stated that these units make up the "execution stage" of the processor. By way of example, assume that M equals eight as shown in FIG. 6a, that is, a processor implementing system 40 according to the preferred embodiment includes eight functional units. For example, these units may include two load/store units, two multiply units, two ALU operation (e.g., add, subtract, and logical) units, and two shift units. This example will be carried forward below to explain the preferred manner in which the elements in annul mask AM are used to either enable or disable the execution operation of each of these eight functional units.

By way of further introduction to the operation of system 40 of FIG. 6a, FIG. 7 illustrates the instructions in group G3 (from FIG. 5a) as they have been scheduled by a compiler and according to an order detailed later. Aligned with each instruction in the far right column is an example of a state of a corresponding bit in annul word AW1 (from FIG. 2c); thus, in the present embodiment, the annul word bit effectively travels with the corresponding instruction. Further illustrated in FIG. 7 in the far left column is an indication of the functional unit which is to execute the corresponding instruction. For example, instruction 1 is assigned to be executed by functional unit $FU_1$, instruction 2 is assigned to be executed by functional unit $FU_2$, and so forth. Note that assignment by a compiler of an instruction to a functional unit in this regard is known in the art, but the addition of the use and implementation of the annul word and related functionality described herein improves that known implementation. An additional concept illustrated by FIG. 7 is the notion of instruction packets, where a packet is defined as a group of instructions scheduled to be executed by corresponding functional units in a single clock cycle. For example, a first packet $P_1$ consists of instructions 1 and 2 and, thus, those two instructions are scheduled to be executed in a single clock cycle. As another example, a second packet $P_2$ consists of instructions 3, B2, 4, and C2 and, thus, those four instructions are scheduled to be executed in a single clock cycle. Since the processor discussed by way of example includes eight functional units, then one skilled in the art should appreciate that a packet for that processor may include up to eight corresponding instructions.

Returning now to system 40 of FIG. 6a, its operation is described given the additional context provided by FIG. 7. Assume initially that annul mask AM is reset to zeroes. Assume further by way of example that at a given time after reset, annul word AW3 in FIG. 6a includes the bit states of the annul word AW1 from FIG. 7, and assume that such bits have been aligned by the compiler in annul word AW3 in the same order as illustrated in FIG. 7, such that the annul bit state for instruction 1 is located at element $E3_1$, instruction 2 is located at element $E3_2$, and continuing through the sequence so that the bit state for the last instruction, instruction 10, is located at element $E3_{12}$. Accordingly, at this time, all bits of annul word AW1 from FIG. 7, as stored as annul word AW3 from FIG. 6a, are output to buffer 42, and provided by buffer 42 as bit group 46. Additionally, the eight (i.e., M=8) least significant bits (LSBs) from bit group 46 form the bits of annul mask AM, that is, the bits from elements $E3_1$ through $E3_8$ and as originally stored in annul word AW3, are transferred to become bits in bit group 46 and, hence, output as bits $AM_1$ through $AM_8$, respectively. Finally, note that the present example is simplified in that annul word AW3 is being illustrated as only partially filled because instruction group G3 has only 12 instructions, whereas annul word AW3 may accommodate up to 32 bits corresponding to a larger block having up to 32 instructions. Also in this regard, it is assumed for reasons apparent later that any upper significant bits of annul word AW3 that did not originally include a bit corresponding to an instruction are reset to zero.

Figure 6B:
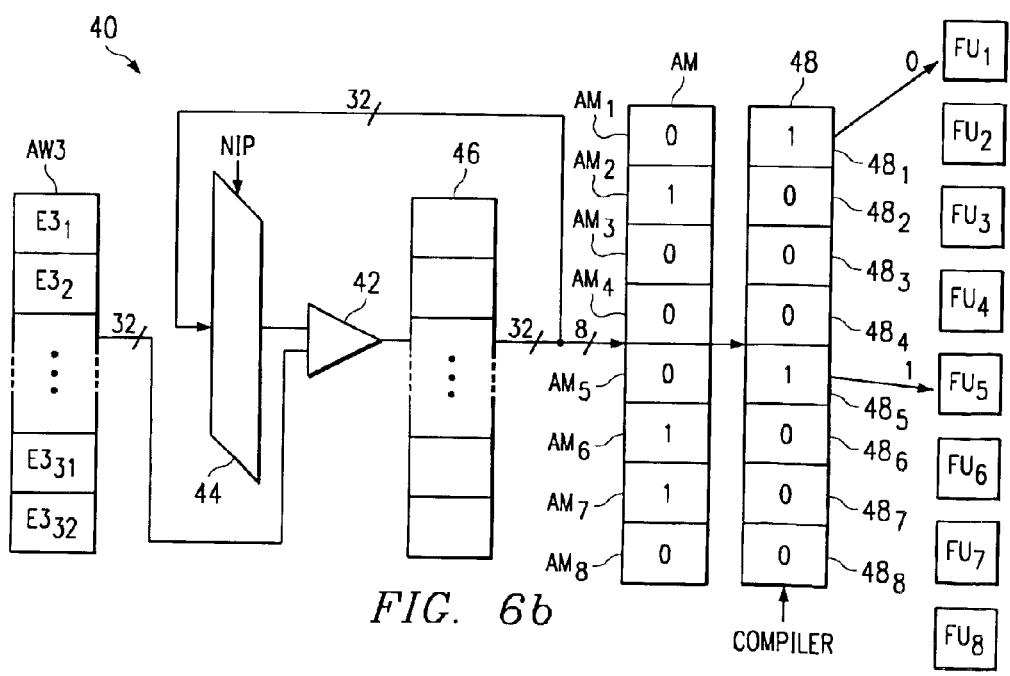
FIG. 6b illustrates the electrical functional diagram of FIG. 6a with the annul mask and use map being set according to a first packet of instructions scheduled for execution.

FIG. 6b further illustrates the set up as described above, and demonstrates the operation for the next clock cycle of the processor including system 40. First, in FIG. 6b, annul mask AM is shown to store the eight least significant bit values from annul word AW1 in FIG. 7 and, thus, these values correspond to the two instructions of packet $P_1$, the four instructions of packet $P_2$, and two of the instructions from packet $P_3$. FIG. 6b also illustrates the values written by the compiler into functional unit use map 48 in order to properly map one or more bits from annul mask AM to the appropriate corresponding functional unit More particularly, in the preferred embodiment, the functional units are given a defined ordering. This ordering is demonstrated by example here according to the subscripts for the functional unit, that is, they are ordered in ascending fashion from $FU_1$ to $FU_8$, and each ordered unit corresponds to a location $48_1$ through $48_8$ in use map 48. As shown below, this ordering is used in the setting of bits in use map 48.

Before completing the discussion of FIG. 6b and having now introduced the notion of ordered functional units, note in the preferred embodiment that the compiler also is responsible for ordering the annul mask bits according to the ordering of the functional units, and this ordering requirement is illustrated in the order set forth in FIG. 7. More particularly, note that the annul word bits of annul word AW1 (and the corresponding instructions) in FIG. 7 do not follow the same sequence as they were described earlier, and it is now noted that they have been re-ordered according to the preferred embodiment Specifically, given the annul word bits AW1 as introduced earlier, the compiler preferably locates those bits in annul word AW3 of FIG. 6b in a successive order whereby the first (i.e., least significant) ordered annul word bit corresponds to the instruction scheduled to be executed by the lowest numbered functional unit, and so forth for higher numbered units. For example, in packet $P_1$, the instruction scheduled to be executed by the lowest numbered functional unit is instruction 1, which is to be executed by functional unit $FU_1$ and, thus, its annul bit is shown in the top row in FIG. 7. As another example, in packet $P_2$, the instruction scheduled to be executed by the lowest numbered functional unit is instruction 3, which is scheduled to be executed by functional unit $FU_1$ and, thus, its annul bit is shown as the first annul bit for packet $P_2$ in FIG. 7. Continuing with the example of packet $P_2$, the instruction scheduled to be executed by the next highest numbered functional unit after functional unit $FU_1$ is instruction B2, which is scheduled to be executed by functional unit $FU_2$ and, thus, its annul bit is shown as the second annul bit for packet $P_2$ in FIG. 7. One skilled in the art will appreciate this aspect for the remaining ordering in FIG. 7.

Returning now to FIG. 6b, in the preferred embodiment and for a given clock cycle the compiler writes a one into each location of use map 48 which corresponds to a functional unit that is assigned an instruction to execute for the current cycle. By way of example, FIG. 6b illustrates the states of use map 48 for the cycle to execute packet $P_1$, which recall includes two instructions. Thus, the compiler writes two logic ones into use map 48, each corresponding to one of the two instructions in packet $P_1$. Further, the location of the ones in use map 48 correspond to the functional units assigned to the respective instructions. For example, use map location $48_1$ is set to one so that the least significant bit from annul mask AM (i.e., $AM_1$) is mapped to functional unit $FU_1$; thus, FIG. 6b illustrates an arrow mapping the annul mask bit value 0 from $AM_1$ to functional unit $FU_1$. As another example, use map location $48_5$ is set to one so that bit $AM_2$ from annul mask AM is mapped to functional unit $FU_5$; thus, FIG. 6b illustrates an arrow the annul mask bit value 1 from $AM_2$ to functional unit $FU_5$. As a result of the preceding, at this time the corresponding bit states of the annul word have been provided to annul mask AM, and these states are mapped from annul mask AM to the corresponding functional units identified in FIG. 7. Indeed, note further that this preferred mapping functionality has been facilitated in part by the previously-described preferential operation whereby the annul bits were put in an order that corresponds to the ordering of the functional units. Lastly, note that the embodiment operation just described causes only a number of bits from the annul mask equal to the number of instructions scheduled to be executed to map to appropriate functional units, where in the just-described example only two annul mask bits were mapped to functional units; as a result, in the present clock cycle the remaining bits in annul mask AM have no effect on processor execution.

Once the instructions and annul mask bits are received by the respective functional units, then each unit operates in response to the state of its received annul mask bit. Specifically, if the annul mask bit is clear (i.e., "0"), the functional unit executes its corresponding instruction. However, if the annul mask bit is set (i.e., "1"), then the functional unit does not execute its corresponding instruction—this may be accomplished merely by disabling the functional unit during the current clock cycle. By preventing the execution of the instruction, the preferred embodiment annuls the instruction, that is, the instruction is suppressed and does not cause any change in the architected state of the processor. To further illustrate these two alternatives, consider again the example of packet $P_1$, as illustrated in FIG. 6b. In this case, functional unit $FU_1$ has received instruction 1 and its annul mask bit state of 0. Accordingly, functional unit $FU_1$ executes instruction 1. To the contrary, functional unit $FU_2$ has received instruction 2 but its annul mask bit state is 1; thus, functional unit $FU_2$ does not execute instruction 2.

Also during the clock cycle in which the instructions of packet $P_1$ are potentially executed (i.e., based on the state of their corresponding annul word bits), system 40 provides to shift register 44 the number of instructions in the packet (NIP) value, where it now may be explained that this number identifies the number of instructions in the packet which during the current clock cycle was forwarded to one or more functional units. Again by way of example for packet $P_1$, then NIP equals two (i.e., for instructions 1 and 2). In addition, recall that shift register 44 has a feedback input from bit group 46. Accordingly, shift register 44 had previously input the annul mask bits provided by bit group 46, which in the current example is all of the annul bits earlier provided by annul word AW3 and corresponding to instruction group G3 in its entirety. Next, shift register 44 shifts out NIP bits at its least significant end and which therefore correspond to the oldest pending instructions. In addition, and for reasons explained below, shift register 44 shifts in NIP bits have a value of zero into its most significant location(s). Thus, in the example of packet $P_1$, shift register 44 shifts out two least significant bits, and shifts in two zeroes at its most significant bits. Consequently, at this point shift register 44 stores in its least significant bit locations the annul word bits corresponding to packets $P_2$ and $P_3$ of instruction group G3 in the order as shown in FIG. 7, and in the remaining more significant bit positions it stores zeros. Each of these bits is output to buffer 42 and thus form a part of bit group 46.

Figure 6C:
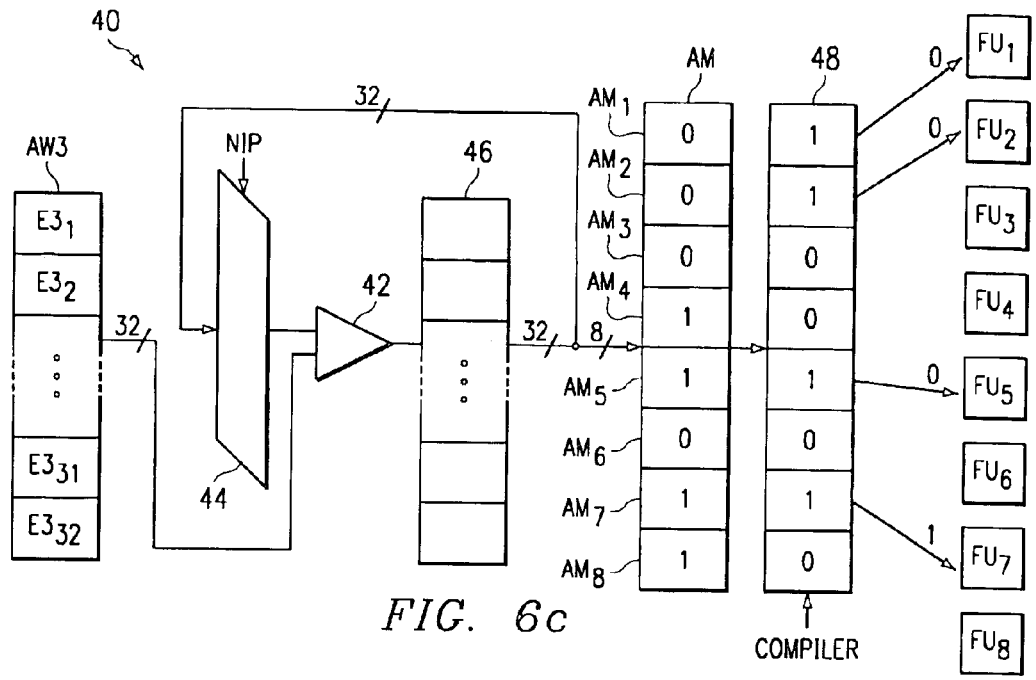
FIG. 6c illustrates the electrical functional diagram of FIG. 6a with the annul mask and use map being set according to a second packet of instructions scheduled for execution.
Figure 6D:
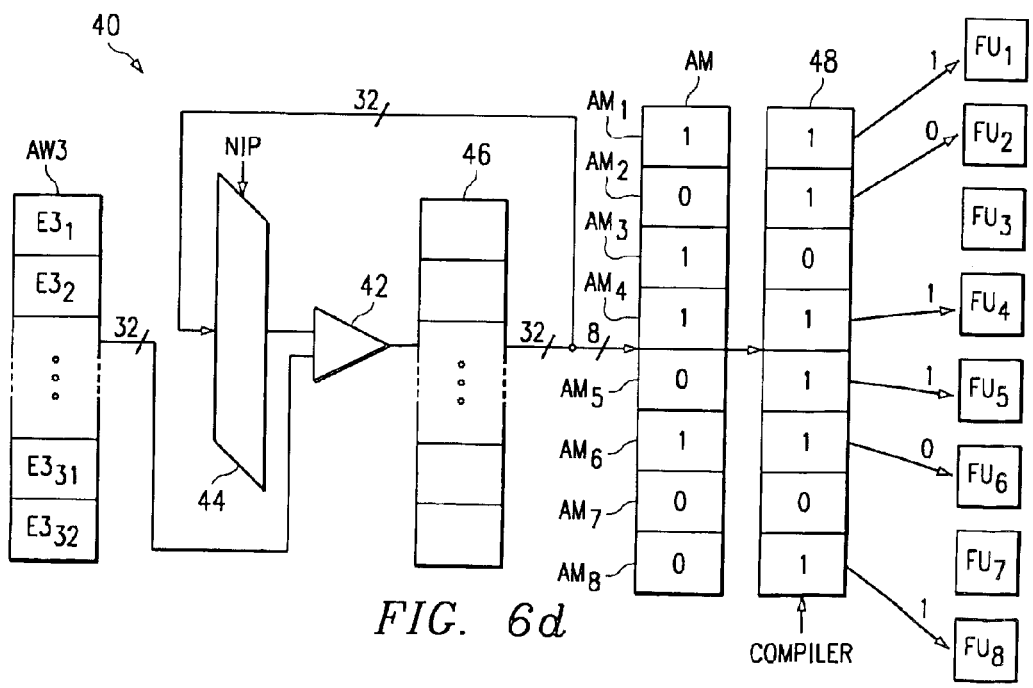
FIG. 6d illustrates the electrical functional diagram of FIG. 6a with the annul mask and use map being set according to a third packet of instructions scheduled for execution.

FIG. 6c illustrates the annul mask bits resulting in the second clock cycle following the clock cycle in which the instructions of packet $P_1$ are forwarded to execution units and potentially executed (i.e., if there is no set annul bit for the instruction). More particularly, recall that shift register 44 shifted out its two least significant bits in connection with the execution of packet $P_1$; as a result, in the following clock cycle as shown in FIG. 6c, the bits in annul mask AM represent the bits of annul word AW1 in the order from FIG. 7 with the two least significant of those bits having been removed by the shift out operation. Thus, one may readily confirm that the bits $AM_1$ to $AM_8$ in annul mask AM of FIG. 6c correspond, in order, to the bits of annul word AW1 of FIG. 7 as pertaining to packet $P_2$ and the four least significant annul word bits pertaining to packet $P_3$.

FIG. 6c also illustrates the mapping bits written by the compiler into use map 48 as pertaining to the possible execution of the instructions of packet $P_2$. Specifically, from FIG. 7, note that instructions 3, B2, 4, and C2 are scheduled for execution by functional units $FU_1$, $FU_2$, $FU_5$, and $FU_7$, respectively. As a result, the compiler sets the bit locations in use map 48 corresponding to those functional units (i.e., $FU_1$, $FU_2$, $FU_5$, and $FU_7$). Still further, because the compiler has, as described earlier, put instructions 3, B2, 4, and C2 in a successive order corresponding to the ordering of the functional units, then the number of least significant bits of annul mask AM equal to the number of instructions in packet $P_2$ (i.e., four instructions and, hence, four annul mask bits) are mapped to functional units $FU_1$, $FU_2$, $FU_5$, and $FU_7$. More specifically, each of functional units $FU_1$, $FU_2$, and $FU_5$ receives an annul mask bit equal to 0 while functional unit $FU_7$ receives an annul mask bit equal to 1. Finally, and in response to the values of the annul mask bits, each of functional units $FU_1$, $FU_2$, and $FU_5$ executes their respective instructions 3, B2, and 4, while functional unit $FU_7$ is disabled in response to the high annul mask bit and, thus, instruction C2 is not executed.

To complete the example which has now been demonstrated in part in FIGS. 6b, 6c, and 7, FIG. 6d illustrates the annul mask bits and use map bits resulting in the third clock cycle, that is, following the clock cycles for potential execution of packets $P_1$ and $P_2$. With respect to the bits in annul mask AM, note that the previous packet, $P_2$, had four instructions and thus, NIP equals four and causes shift register 44 to shift out four least significant bits and to shift in a value of zero at its four most significant bits; these values pass through buffer 42 and form bit group 46, with the eight least significant bits passing to annul mask AM. Thus, in FIG. 6d annul mask AM stores the six bits of annul word AW1 from FIG. 7 corresponding to packet $P_3$ and in the order shown therein, and the two most significant bits are zero due to the earlier shifting in of a zero value by shift register 44 into its more significant bits. With respect to use map 48, its values have been set by the compiler to map the annul bits corresponding to the packet $P_3$ instructions to the appropriate functional units. Thus, one skilled in the art may readily confirm that FIG. 6c illustrates a proper mapping of each annul mask bit, as corresponding to a packet $P_3$ instruction, to the appropriate functional unit. In response and given the preceding, it should be readily appreciated that functional units $FU_2$ and $FU_6$ execute their respective instructions 7 and 8, while functional units $FU_1$, $FU_4$, $FU_5$, and $FU_8$ do not execute their respective instructions 5, 9, 6, and 10, that is, instructions 5, 9, 6, and 10 do not affect the architected state of the processor (i.e., they are annulled).

Having now illustrated the preferred embodiment of shifting an annul word through shift register 44, an additional point may be made returning to FIG. 3b. Specifically, recall that method 20 processes an instruction group until a condition at a bottom level is detected by step 28. Recall further that this looping methodology will cause conditions at different levels of a code tree to be evaluated, and finally recall that it was noted that the method, for conditions that are not at the bottom level of the tree, will set annul bits either along the "THEN" or "ELSE" path relating to the condition. Further in this regard, it is now noted that for any instruction(s) in any packet(s) above that level, the annul bits corresponding to those prior packet instructions will already have been shifted out by shift register 44. Accordingly, the annul bits corresponding to any packet preceding the instruction being evaluated are no longer an issue and, therefore, are not further altered by the method.

Also in view of the preferred operation of system 40, note that other alternative embodiments are contemplated for suppressing instructions in response to an annul word. One approach is to eliminate the use map 48 and to completely fill the annul mask for each cycle, that is, to couple a number of bits from the annul word to the annul mask where the number of bits equals the total number of functional units, and to always map a given location in the annul mask to a same corresponding functional unit. In this case, for a given clock cycle when an execution unit is not scheduled to execute, then the annul mask bit passed to it has no net effect (i.e., since the execution unit was already scheduled not to operate during the present clock cycle). Another approach is to keep track of the order of instructions in the instruction stream, so that the $N^{th}$ instruction of a packet is annulled by bit N-1 of the annul mask. However, given that there is otherwise no need to maintain a record of instruction ordering within a packet, this approach might lead to additional hardware which may not be desired in a given implementation. Still another approach, at the expense of additional annulling hardware, is to have an incoming N bit annul word where its set bits are mapped only to those instructions that have not been annulled by a previous annul word, and merging this more recent annul word into an older annul word. While this alternative requires increased complexity, it allows increased range when annulling over hierarchies of if-then-else trees. Note that for an 8-way VLIW, in the first clock cycle the new annul word would be logically OR'ed into only the bottom 8 bits of the previous annul word. Higher bits could have an additional clock cycle to perform the merging of annul bits.

Each of the various approaches set forth above ultimately provides an annul word that is translated to potentially suppress the operation of a functional unit with respect to an assigned instruction. Further in this regard, note that the annul word therefore represents information about potentially not executing an instruction where this information is known at a time earlier than the time that a predication determination would be made with respect to the same instruction if predication were used. As a result, in addition to disabling a functional unit for a given clock cycle in response to a set annul word bit, an extension of the preferred embodiment may use the advance information of a set annul bit to power down other hardware that is known to be not needed because an instruction will be annulled. For example, in the case of predication, even though the predicate is ultimately found to be false, the predicate information may come too late to prevent updating the two registers forming the inputs to an adder which would be used to perform an add (or subtract) if a predicate is found to be true; however, the annul word bits may be known early enough to avoid clocking these registers and thereby avoid dissipating the extra power that the adder would otherwise consume.

As described earlier in connection with FIGS. 3a and 3b, in the preferred embodiment the analysis of an instruction group is performed at the compiler level by having the compiler form different annul words based on different possible outcomes of the condition(s) in the program tree. Given the existence of those annul words, the preferred embodiment further implements the present teachings by inserting into the instruction stream an instruction (or more than one instruction) that will execute either concurrently or after the condition to which it applies and in response that will provide the appropriate annul word corresponding to the actual outcome of the condition and to prepare the architecture to respond to the relevant annul word. For sake of reference, for the remainder of this document this instruction (i.e., that causes the annul to be performed according to an annul word) is referred to as an annul instruction. The annul instruction, and its related annul word, may be created and associated with one another in various manners giving rise to numerous different embodiments, as detailed below. Before discussing those embodiments, note that regardless of the implementation, an additional preferred aspect arises with respect to the packet location of the annul instruction (s). Specifically, it is preferable for the compiler-inserted annul instruction(s) to commence its annulling operations (i.e., suppression of instructions) with instructions executed in the cycle after the packet which includes the annul instruction; in other words, it is preferable that the annul instruction not affect any of the instructions in the same packet as the annul instruction, regardless of whether they precede or follow the annul instruction in the instruction stream.

Turning now to various embodiments of the annul instruction and its related annul word, in a first embodiment, two constant-generating instructions are executed to generate two corresponding 16-bit constants, where the two constants are then concatenated to form a 32-bit annul word, and then the annul word is used in response to an additional annul instruction. Alternatively, a load instruction may cause a load of a 32-bit annul word, such as from memory, followed by an annul instruction causing the loaded annul word to be used to selectively suppress execution of additional instructions. In a second embodiment, the annul word is an immediate operand included within an instruction; in this regard, note that many contemporary instructions include numerous bits, such as source identifiers, a destination identifier, an immediate bit, and others. However, to achieve the annul functionality, many of these bits would not be required and, thus, these additional bit locations could be used to embed an annul word directly into the instruction. In this case, however, there is likely to be a limited number of available bits and, thus, the embedded annul word may be limited less than 32 bits (e.g., a limit of 16 bits). In a third embodiment, the annul instruction provides an annul word of more than 32 bits, such as by specifying two 32-bit register sources which, when combined, provide a total of 64 annul bits for up to 64 incoming instructions. This approach may likely require a load-double instruction (i.e., a 64-bit load) to produce the 64 annulling bits prior to the actual annulling operation. In a fourth embodiment, the annulling instruction is predicated, and includes two different source registers, each having a different annul word based on the response to the predicate. For example, returning to instruction group G3, condition A3 at the top of the tree could be used as a predicate, where a first source register stores an annul word to be used if condition A3 is true and a second source register stores an annul word to be used if condition A3 is false. In a fifth embodiment, the annul instruction again is predicated as is the case in the fourth embodiment, but in the fifth embodiment only a single register source is used, where one half of the register source provides the annul word if the condition is true while the other half of the register source provides the annul word if the condition is false. In a sixth embodiment, the annul instruction includes an argument N which merely causes the next N instructions to be annulled, but unlike the preceding embodiments this embodiment necessarily requires that the sequence of the code is known and there is no mingling of code from outside of the block within the block (i.e., so that such mingled instructions are not wrongfully annulled). As a final and seventh embodiment, the instruction includes a predicate and a single source register. In this case, if the predicate is true the instructions corresponding to the 1's in the source register are annulled while if the predicate is false the instructions corresponding to the 0's in the source register are annulled. Further with respect to this final instruction embodiment, it includes an additional argument X that specifies and thereby possibly limits the number of bits within the source register to be used. Specifically, note that if the bit capacity of the source register (i.e., annul word) is greater than the number of instructions in a particular group, then the register will store 0's in its most significant bits corresponding to a lack of instructions for those bits—given this possibility, the argument X in this seventh embodiment is set to specify only those bits within the source register that correspond to actual instructions so that these more significant bits are not wrongfully interpreted as applying to instructions and used to annul (or not annul) such instructions.

Still further embodiments arise from the preceding given the trends in parallelism and latency. Specifically, in general, the number of instructions which it is useful to annul is a function of the branch latency and the number of instructions which can be executed in parallel The product of these two aspects is the preferable limit on the number of instructions it is worthwhile to annul rather than taking a branch. The trends in computer architecture lead to a gradual increase in both of these quantities. As a result, in the future it is likely that it will be desirable to annul under a mask even larger than 64 bits. Still further, as the present teachings are employed larger code blocks will become useful to implement using annulling instead of branching, and the use of hierarchies of annul instructions to implement hierarchies of if-then else constructs will increase. Indeed, it may be predicted that a 16 way VLIW might have to do much more of this than an 8-way VLIW because branches are twice as expensive in terms of potential instructions.

A final consideration arises from the preferred annulling methodologies of the present document when viewed in the context of interrupt handling. Specifically, in the preferred embodiment, there are two manners of handling interrupts in the presence of pending instructions that are identified to be annulled (i.e., that have corresponding bits set in an annul word). As a first approach, when an interrupt is received the present annul word is saved into a register and then the annul word is cleared so that it does not affect the interrupt; thereafter, the stored annul word is restored upon returning from the interrupt by executing another annul instruction with the saved information as the data for the new annul instruction As a second approach, interrupts may be disabled whenever the annul word has any non-zero bits (i.e., when at least one instruction already has been identified to be annulled).

The discussion is now directed to a different application of the preferred embodiment where branch instructions are not the immediate focus, but instead the following demonstrates how the preferred embodiment also has beneficial use in the field of what is referred to in the art as software pipelining. To illustrate software pipelining, consider the following two lines of code written in the C language and shown in Table 1:

TABLE 1

| Code | Line identifier |
| --- | --- |
| FOR j=0, j<L, j++ | a1 |
| D[j] = A[j] + B[j]; | a2 |

The code of Table 1 represents a high level language loop to add a vector A to a vector B, both of length L, with the results stored in a vector D.

Next, consider the following low level language mnemonics in Table 2, which represent a typical set of low level code to implement instructions a1 and a2 of Table 1:

TABLE 2

| Mnemonic | Line identifier |
| --- | --- |
| Load R1 (with addend) | b1 |
| Load R1 (with addend) | b2 |
| Add R1, R2 | b3 |
| Store R3 | b4 |

Instructions b1 through b4 represent a single loop to add an element of a vector to an element of another vector and to store the result; more particularly, instructions b1 and b2 load the addends into registers R1 and R2, instruction b3 adds those addends, and instruction b4 stores the result in a register R3.

By way of additional background, assume that instructions b1 through b4 are executed by a processor which has the following common contemporary attributes. First, assume that the processor requires five clock cycles to perform a load instruction. Second, assume that the processor includes two different load units. Given these assumptions, note that instructions b1 and b2 may occur simultaneously, but instruction b3 must wait for instructions b1 and b2 to complete, that is, b3 must wait the five clock cycles associated with instructions b1 and b2. Moreover, if instructions b1 through b4 are to occur numerous times, such as is the case if L equals a large number in instruction a1, then this same delay occurs for each loop and becomes increasingly more costly in terms of processor efficiency. To reduce this potential inefficiency, software pipelining has been implemented in the art, as further detailed below.

FIG. 8 illustrates instructions b1 through b4 as applied to a loop where L equals 128, and implemented using software pipelining. As a matter of introduction, note that software pipelining is often used for software looping, and attempts to optimize the number of instructions executed per clock cycle, where different instructions in a given clock cycle may pertain to different iterations of the loop. Turning to FIG. 8 by way of example, in each row it illustrates which of instructions b1 through b4 are executed for a given clock cycle, where the subscript of each of those instructions indicates the corresponding loop number that pertains to the given instruction. For example, looking at clock cycle 0, instructions b1 and b2 are both executed for the instance of the loop value equal to 0 (i.e., j=0 in instruction a1, above). Accordingly, during clock cycle 0, two load instructions commence for the loop value equal to 0, and these load instructions (i.e., b1 and b2) are shown in FIG. 8 with a subscript value of 0. Similarly, in clock cycle 1, two load instructions commence for the loop value equal to 1, and this same pattern continues through clock cycle 4 (and beyond as detailed later).

In clock cycle 5 of FIG. 8, note that five clock cycles have elapsed since the two load instructions associated with loop 0 commenced. Further, recall that the example assumes that a load instruction requires five clock cycles to complete. Therefore, as of clock cycle 5, the loaded addends from loop 0 are available in registers to be added to one another. As a result and as is shown to occur during clock cycle 5 by the illustration of instruction b3 (i.e., ADD R1, R2), these addends are summed. Further, because the add instruction in clock cycle 5 is therefore associated with the loop value of 0, then instruction b3 is shown to have a subscript value of 0. Finally, assume that the add instruction in clock cycle 5 requires only a single clock cycle to produce its sum.

Turning next to clock cycle 6 in FIG. 8, note that the first three instructions shown therein follow the patterns illustrated earlier, that is, two load instructions commence and an add instruction is executed using the addends loaded by instructions which began five clock cycles earlier. In addition and as shown in the last entry of the row corresponding to clock cycle 6, instruction b4 (i.e., STORE R3) is also executed, where instruction b4 stores the sum commenced by loop 0 and summed in the preceding clock cycle 5. Thus, by the end of clock cycle 6, the first loop (i.e., j=0) of the instructions a1 and a2 is complete; however, due to the pattern having now been introduced, as of that same time the load instructions through loop 6 have begun, and the store instructions through loop 1 are complete.

Given the illustration through clock cycle 6 note that, from clock cycle 6 through clock cycle 127, in each such clock cycle there is a same pattern; in other words, in each such clock cycle two load instructions begin, an add instruction is executed using the addends corresponding to the load instructions commenced five clock cycles earlier, and a store instruction is executed using the using the addends corresponding to the load instructions commenced six clock cycles earlier. In other words, from clock cycle 6 through clock cycle 127, the instructions may be represented as:

$b1_N \; b2_N \; b3_{N-5} \; b4_{N-6}$

From this pattern, it may be seen how the instructions pass in a staggered fashion according to different loop values, and for this reason this process is akin to a pipeline and gets its name of software pipelining. Also with respect to terminology in the art, note that the time period including clock cycles during which each instruction (b1 through b4) is executed is referred to as the code loop. Further, the time period consisting of the clock cycles preceding that time period (e.g., clock cycles 0 through 5) and during which only some of the loop instructions are executed is referred to in the art as the prologue. Lastly, and as detailed below, after the code loop eventually all the load instructions for the entire loop are complete, but remaining clock cycles are required to complete the instructions (e.g., add and store) for each loop; this remaining time period is referred to in the art as the epilogue.

FIG. 8 also illustrates the epilogue which begins in clock cycle 128. More particularly, as of clock cycle 128, each load instruction for the loop has already begun and, thus, no new load instruction (i.e., b1 or b2) is shown. However, also as of clock cycle 128, the already-commenced load instructions are working toward completing, or have completed, loads with respect to addends that once loaded will be summed and then stored. For example, in clock cycle 128, the addends loaded for loop 122 are now available for summing and, thus, during clock cycle 128 instruction b3 adds those addends (shown by $b3_{122}$). As another example, in clock cycle 128, the addends loaded for loop 121 have been loaded and summed and, thus, are now available for storing; accordingly, during clock cycle 127 instruction b4 stores that sum of those addends (shown by $b4_{121}$). This process therefore repeats through clock cycle 132. Finally, in clock cycle 133, the sums for loop values 0 through 126 have been calculated and stored, but also as of that time the addends loaded for loop 127 have been loaded and summed and, thus, are now available for storing; accordingly, during clock cycle 133 instruction b4 stores that sum of those addends (shown by $b4_{127}$).

The preceding demonstrates the advantage of software pipelining in that it is shown how during each clock cycle in the loop code all instructions in the loop are executed while taking into account the delays of earlier instructions. Indeed, due to this advantage, software pipelining is very commonly used, particularly for instances of large vector or array operations (e.g., pixels on screens, filter coefficients, and so forth). However, the present inventor has recognized that notwithstanding this benefit, there also may be drawbacks to software pipelining, and these drawbacks are considerably reduced by applying the preferred embodiment, as detailed earlier, to the context of software pipelining. To further demonstrate these aspects, the drawbacks arising from software pipelining are first discussed below, followed by an application of the preferred embodiment to software pipelining in order to reduce the effects of such drawbacks.

The drawback from software pipelining arises from its use of program memory (or instruction) space in a processor. More particularly, it is well known that processor memory is a key contributor to processor cost and complexity and, thus, design considerations often limit the amount of such memory; further therefore, if a large program must be accommodated by a processor, then its instruction memory must be more complex and more expensive. Applying these principles to the instructions in FIG. 8, note that the prologue consists of thirteen instructions. Thus, each of these instructions may be thought of as requiring its own space in the instruction memory (i.e., an addressable space so that the instruction may be fetched and executed). As a result, thirteen memory locations must be available for the prologue in the example of FIG. 8. Similarly, the epilogue consists of eleven instructions and, thus, eleven memory locations must be available for the epilogue in the example of FIG. 8. Lastly, however, note that the loop code is much more efficient in its use of memory space. Particularly, since each line of the loop code consists of an identical set of instructions, then typically that set of instructions require space in memory, and a few additional instructions implement a loop to repeatedly execute just that set of instructions for the appropriate number of iterations; thus, in the example of FIG. 8 only four memory spaces are required for the four instructions per clock cycle. For each iteration of this loop, and given the clock cycle delay described earlier for the present example, then two loads commence, an add executes using the addends which are available and, which, given the five clock cycle delay are therefore those relating to the load instructions commenced five cycles earlier, and a store executes using the sum which is available and, which, given the five clock cycle delay are therefore those relating to the load instructions commenced six cycles earlier. To implement this loop, there is also required an initialization such as a setting of a counter, a decrement of that counter for each loop in the loop code, and a predicated branch at the end of the loop to return to the beginning of the loop until the counter reaches an appropriate count. As a result, to implement the loop code of FIG. 8 in memory space requires a total of four instructions for those shown in each line, as well as an initialization instruction, a decrement instruction, and a branch instruction, thereby resulting in a total of only seven instructions and seven memory spaces. Given the preceding, note that relative amount of memory space required for the loop code is less than that for either the prologue or the epilogue, and is particularly low given that the loop code once complete for all of its iterations accounts for many more instruction executions than does either the prologue or the epilogue.

FIG. 9 illustrates instructions b1 through b4 of FIG. 8 as again applied to a loop where L equals 128 and implemented using software pipelining, but in FIG. 9 the software pipelining is improved because the preferred embodiment is also applied so that certain instructions may be annulled. More particularly, note that in every clock cycle of FIG. 9, all four instructions used in the loop code of FIG. 8 are scheduled for execution. As an important distinction from the prior art, however, some of the instructions in FIG. 9 are annulled using the preferred embodiment described earlier, where the annulled instructions are illustrated in FIG. 9 using an "A" for the subscript of the instruction. Indeed, the annulled instructions may be used in clock cycles corresponding to either or both of the prologue and epilogue from FIG. 8, as further detailed below.

Looking to a comparison of the prologue of FIG. 8 and the same clock cycles of that prologue as shown in FIG. 9, and looking by way of example to clock cycle 0, the four instructions b1, b2, b3, and b4 are scheduled to execute. However, note that instructions b3 and b4, as shown by their "A" subscripts (i.e., $b3_A$ and $b4_A$), pass through the instruction pipeline but are annulled so that they do not affect the architected state of the processor. Thus, by comparing clock cycle 0 in FIGS. 8 and 9, one skilled in the art will appreciate that in both cases instructions $b1_0$ and $b2_0$ are executed, and the effect on the architected state of the processor is no different for either figure due to the annulling steps taken with respect to instructions b3 and b4 in FIG. 9. Still further, recall from FIG. 8 that the prologue consists of the instructions in clock cycles 0 through 5. Using the preferred embodiment, the same instructions of the FIG. 8 prologue may be executed in clock cycles 0 through 5 of FIG. 9, while at the same time annulling one or more additional instructions during each of those clock cycles.

Looking to a comparison of the epilogue of FIG. 8 and the same clock cycles of that epilogue as shown in FIG. 9, and looking by way of example to clock cycle 128, the four instructions b1, b2, b3, and b4 are again scheduled to execute. However, instructions b1 and b2, as shown by their "A" subscripts (i.e., $b1_A$ and $b2_A$), pass through the instruction pipeline but are annulled so that they do not affect the architected state of the processor. Thus, by comparing clock cycle 128 in FIGS. 8 and 9, one skilled in the art will appreciate that for both Figures instructions $b3_{123}$ and $b4_{122}$ are executed, and the effect on the architected state of the processor is no different for either figure due to the annulling steps taken with respect to instructions b1 and b2 in FIG. 9. Recall also from FIG. 8 that the epilogue consists of the instructions in clock cycles 128 through 133. Using the preferred embodiment, the same instructions of the FIG. 8 epilogue may be executed in clock cycles 128 through 133 of FIG. 9, while at the same time annulling one or more additional instructions during each of those clock cycles.

From the preceding, one skilled in the art should now appreciated that FIG. 9 illustrates that software pipelining may be modified by implementing the preferred embodiment. More particularly, for a software loop which previously gave rise to prior art software pipelining, the preferred embodiment is implemented such that for all clock cycles of the loop all instructions in the loop code are scheduled to execute. Additionally, during certain ones of those clock cycles one or more of those instructions are annulled (i.e., by setting the appropriate bits in the annul word). The particular instruction(s) which are annulled may be determined based on the relationship of the given iteration to the total number of iterations required to complete the loop. For the example of FIG. 9, for example, two instructions are annulled during clock cycles 0 through 4 of the 134 clock cycles, one instruction is annulled during clock cycle 5 of the 134 clock cycles, two instructions are annulled during clock cycles 128 through 132 of the 134 clock cycles, and three instructions are annulled during clock cycle 133 of the 134 clock cycles.

To further demonstrate the scope of what is illustrated in FIG. 9, note that the instructions shown therein may be executed using the following instructions shown in Table 3:

TABLE 3

| Mnemonic | Line identifier |
|---|---|
| Load R1 (with 1st annul word) | c1 |
| Annul | c2 |
| Set counter A0 (branch counter) | c3 |
| Set counter A1 (annul counter) | c4 |
| Load R1 (with addend) | c5 |
| Load R1 (with addend) | c6 |
| Add R1, R2 | c7 |
| Store R3 | c8 |
| Decrement A0 | c9 |
| Decrement A1 | c10 |
| [A0≠0], branch c5 | c11 |
| [A1=0], Load R1 (with 2nd annul word) | c12 |
| [A1=0], Annul | c13 |

The instructions of Table 3 are now explored in greater detail, and reference also is made in this discussion back to FIG. 9. Further, for sake of comparison, the instructions are discussed in groups which approximate the operations that fall into each of the prologue, loop code, and epilogue of the prior art.

Looking to the beginning of Table 3, instruction c1 loads a first annul word into an appropriate register. The bits of the loaded annul word are appropriately set to annul those instructions shown as annulled in clock cycles 0 through 5 of FIG. 9. In other words, these annulled instructions are those which were not in the pipeline in the prologue of FIG. 8. Further, because there are a total of eleven instructions to be annulled, then the annul word will therefore have eleven corresponding set bits. Instruction c2 is the annul instruction, which thereby moves the register-stored annul word into the appropriate hardware, that is, the annul word may then be treated as annul word AW3 in FIG. 6a. Instruction c3 sets a first counter designated A0, where this counter is used as further apparent below to define the total number of clock cycles required to complete all the clock cycles in FIG. 9 and, thus, in the present example counter A0 is set to 134. Instruction c4 sets a second counter designated A1, where this counter is used as further apparent below to define the total number of clock cycles required to complete all instructions in FIG. 9 which precede what would be the epilogue in FIG. 8 and, thus, in the present example counter A1 is set to 128. At this point, therefore, the load, add, and store operations are ready to begin as further explored below.

The first iteration of instructions c5, c6, c7, and c8 represents what is shown as clock cycle 0 in FIG. 9. More particularly, instructions c5 and c6 cause the execution of $b1_0$ and $b2_0$. However, due to the annul word load and implementation of instructions c1 and c2, then instructions c6 and c7 are annulled, as corresponding to annulled instructions $b3_A$ and $b4_A$ of clock cycle 0 in FIG. 9. Instructions c9 and c10 decrement counters A0 and A1, respectively. Thus, at this point, clock cycle 0 of FIG. 9 is complete and the process is directed to clock cycle 1 of FIG. 9. Further in this regard, instruction c11 is predicated to execute only if counter A0 has not reached 0. At this point in the example, counter A0 has only been decremented once and thereby stores a value of 133; accordingly, the predicate is not satisfied and the instruction flow is returned to instruction c5. One skilled in the art will appreciate from this return branch operation that for each clock cycle until counter A0 reaches a value of 0, then instructions c5, c6, c7, and c8 are scheduled for execution during that clock cycle. Moreover, because of the earlier-loaded 11-bit annul word, then a total of 11 instructions are annulled during these repeated clock cycles, where the annulled words are those shown with an "A" subscript in clock cycles 0 through 5 of FIG. 9.

Once counter A0 is decremented to a value of 128, then instructions c3, c4, c5, and c6 have been scheduled for execution and executed, if not annulled, a total of six times, thereby concluding clock cycles 0 through 5 in FIG. 9. Also at this time, counter A1, having been decremented six times, equals a value of 122. Further, by clock cycle 6, there are no remaining set annul word bits and, thus, until counter A0 reaches 6 the Table 3 code will schedule and execute each of instructions c5, c6, c7, and c8, with no annulling of those instructions.

When counter A0 reaches a value of 6, counter A1 will at that time have been decremented to a value of 0. As a result, the predicate of instructions c12 and c13 is met; in response, instruction c12 loads a second annul word into an appropriate register, where the bits of the second annul word are appropriately set to annul those instructions shown as annulled in clock cycles 128 through 133 of FIG. 9. Because there are a total of 13 instructions to be annulled, then the annul word will therefore have 13 corresponding set bits. Instruction c13 is an annul instruction which moves the second register-stored annul word into the appropriate hardware, again represented by annul word AW3 in FIG. 6a.

Concluding the present example, at this point counter A0 equals 6 and counter A1 equals 0. Accordingly, instruction c11 returns the flow to instructions c5, c6, c7, and c8. Thus, the next iteration of instructions c5, c6, c7, and c8 represents what is shown as clock cycle 128 in FIG. 9. More particularly, instructions c7 and c8 cause the execution of $b3_{123}$ and $b4_{122}$. However, due to the second annul word load and implementation of instructions c12 and c13, then instructions c5 and c6 are annulled, as corresponding to annulled instructions $b1_A$ and $b2_A$ of clock cycle 128 in FIG. 9. Instructions c9 and c10 decrement counters A0 and A1, leaving them will values of −1 and 5, respectively. Thus, the predicate of instruction c11 is still not met and, therefore, the process repeats for another five clock cycles, that is, through clock cycle 133 of FIG. 9. Finally, after those five clock cycles, counter A0 has been decremented so that it now stores a value of 0; accordingly, the predicate of instruction c11 is met and therefore no branch is taken, thereby completing the loop and instructions of Table 3.

Having demonstrated the methodology of Table 3, it is now noted how it renders a more efficient operation than software pipelining in the prior art and, more particularly, how the preferred embodiment when implemented with software pipelining improves the usage of instruction memory space. Recall that the number of instructions required for the software pipelining example in FIG. 8 consisted of thirteen prologue instructions, seven loop code instructions, and eleven epilogue instructions for a total of thirty-one instructions. In contrast, Table 3 demonstrates how appropriately located and executed annul instructions, along with additional instructions, may implement all of the FIG. 9 operations using a total of thirteen instructions. Thus, by implementing the preferred embodiment in software pipelining for the present example which contrasts FIG. 9 with FIG. 8, there is a reduction of eighteen total instructions from the thirty-one required of the prior art to the thirteen required in the preferred embodiment; in other words, for this example, there are 58 percent less instructions used. Consequently, there is likewise a 58 percent reduction in the amount of required instruction memory space. As mentioned earlier, any such reduction improves complexity and cost and, thus, it now has been shown how the preferred embodiment may have a dramatic effect in this regard.

As a final consideration of the preceding, note further that the code of Table 3 is only by way of example, and its ordering is also to logically demonstrate the example with it understood that such code and/or ordering may be modified according to various considerations. For example, different optimization techniques may be applied to re-arrange some of the code. As another example, in many processors, there is a delay associated with the branches; thus, by way of example in such a case, the branch of instruction c11 may be placed by the compiler earlier in the code so that its delay causes the actual branch to be taken (or not taken) at the appropriate time.

Figure 10:
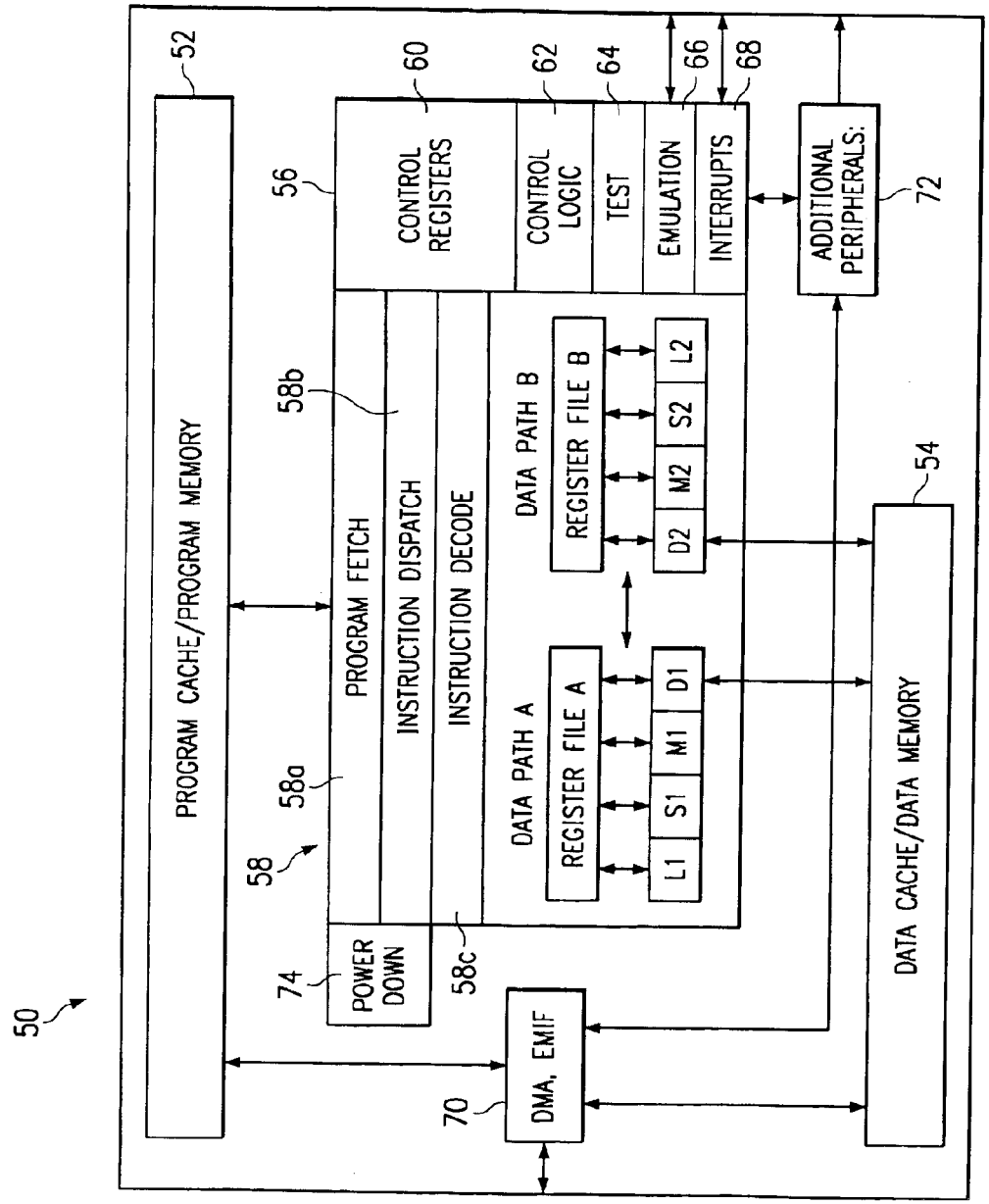
FIG. 10 illustrates a preferred embodiment of a processor implementing the circuit, systems, and methods illustrated by the preceding Figures.

FIG. 10 illustrates a block diagram of a processor 50 in which system 40 as well as the previously described inventive methodologies may be implemented, thereby permitting a more efficient operation with respect to either or both of avoiding branch instruction complexities and enhancing software pipelining. Processor 50 is preferably a single integrated circuit and is shown in block form so as to simplify the illustration and discussion in the context of the instructions described above, while one skilled in the art will readily appreciate that additional details arise from the blocks shown as pertaining to processor operation and functionality. Further, processor 50 typifies a processor from the TMS320 C6000 series of processors commercially available from Texas Instruments Incorporated, including the TMS320C62x/C67x digital signal processors.

Turning to processor 50, it includes a program memory 52, which on some devices can be used as a program cache. Processor 50 also includes a data memory 54. Memories 52 and 54 are coupled to communicate with a central processing unit ("CPU") 56, which includes a pipeline 58 having various stages shown as a program fetch unit 58a, an instruction dispatch unit 58b, and an instruction decode unit 58c. The pipeline of CPU 56 further includes two data paths shown as path A and path B, where each data path has a corresponding set of four functional units (L1, S1, M1, and D1 for path A and L2, S2, M2, and D2 for path B). Briefly, the operational functionality of the functional units is set forth in the following Table 4, where additional functionality may be added or removed from each unit according to a given implementation:

TABLE 4

| Functional Unit | Fixed-point | Floating-point operations |
| --- | --- | --- |
| L | 32/40-bit arithmetic and compare operations | Arithmetic operations |
|  | Leftmost 1 or 0 bit counting for 32 bits | DP→SP, INT→DP, INT→SP |
|  | Normalization count for 32 and 40 bits | conversion operations |
|  | 32-bit logical operations |  |
| S | 32-bit arithmetic operations | Compare |
|  | 32/40-bit shifts and 32-bit bit-field operations | Reciprocal and reciprocal square-root operations |
|  | 32-bit logical operations | Absolute value operations |
|  | Branches | SP→DP conversion operations |
|  | Constant generation |  |
|  | Register transfers to/from the control register file (S2 only) |  |
| M | 16 by 16 multiply operations | 32 by 32 bit fixed-point multiply operations |
|  |  | Floating-point multiply operations |

TABLE 4-continued

| Functional Unit | Fixed-point | Floating-point operations |
| --- | --- | --- |
| D | 32-bit add, subtract, linear and circular address calculation | Load doubleword with 5-bit constant offset |
|  | Loads and stores with a 5-bit constant offset |  |
|  | Loads and stores with 15-bit constant offset (D2 only) |  |

Each set of functional units may communicate with a corresponding data path register file (shown as Register file A and Register file B), where each register file includes 32 32-bit registers. While not shown some of these communications also include cross-coupled paths whereby some functional units from path A may read Register file B while some functional units from path B may read Register file A. CPU 56 also includes additional supporting hardware, including a control register 60, control logic 62, test logic 64, emulation logic 66, and interrupt logic 68. Processor 50 also may include additional blocks such as a direct memory access ("DMA")/external memory interface ("EMIF") block 70 for performing the functions corresponding to these identifiers. Processor 50 also includes a peripheral block 72 which may support connection to various peripherals, including by way of example, timers, serial port(s), and a host-port interface. Finally, processor 50 includes a power down logic block 74 that can halt CPU activity, peripheral activity, and phase locked loop (PLL) activity to reduce power consumption.

The operation of processor 50 is now described in connection with the aspect of instruction treatment in the pipeline so that it may be further appreciated how the inventive annul circuits, systems, and methods detailed above provide their functionality in processor 50, again by way of example. Together, program fetch unit 58a, instruction dispatch unit 58b, and instruction decode unit 58, can deliver up to eight 32-bit instructions to the functional units every CPU clock cycle. The processing of the instructions occurs in each of the two data paths (A and B), and recall each of these paths contains four functional units (L, S, M, and D) and 32 32-bit general-purpose registers. To further illustrate the pipeline operation of processor 50, below such operation is described relative to the 'C62x by way of example.

Looking to fetch unit 58a, it uses a fetch packet of eight instructions. All eight of the instructions proceed through fetch processing together, which consists of four phases (program address generate phase, program address send phase, program access ready wait phase, and program fetch packet receive phase). During the program address generate phase, the program address is generated in the CPU. In the program address send phase, the program address is sent to memory. In the program address send phase, a memory read occurs. Finally, in the program address send phase, the fetch packet is received at the CPU.

Looking to instruction dispatch unit 58b and instruction decode unit 58c, in dispatch unit 58b the fetch packets are split into execute packets. Execute packets consist of one instruction or from two to eight parallel instructions. Dispatch unit 58b also assigns the instructions in an execute packet to the appropriate functional units. In the operation of instruction decode unit 58c, the source registers, destination registers, and associated paths are decoded for the execution of the instructions in the functional units. Thereafter, for a given clock cycle, each functional unit that was assigned an instruction may execute its corresponding instruction, where it now should be apparent that such execution will occur in the preferred embodiment only if the annul bit corresponding to the assigned instruction, if any, is not set; given that an execute packet may include up to eight instructions, then in a single clock (and execution) cycle, these up to eight instructions may be executed (assuming cleared annul bits). If an execute packet has less than eight instructions, the remaining slots of the packet that do not have a corresponding instruction are treated as no operation instructions ("NOPs"), and the NOP(s) is not dispatched to a functional unit because there is no execution associated with it.

Execution in processor 50 is broken down into five phases to accommodate certain instructions. However, for most instructions they require only one of these phases to execute. For example, for a so-called single cycle instruction, it executes in one phase in which it computes a result and writes the result to a register. As another example, for a multiply instruction, in a first execute phase it reads operands and begins its computation and in a second execute phase it computes a result and writes the result to a register. As still another example, for a load instruction, it executes in five phases, which perform the following steps, in order: (1) compute address; (2) send address to memory; (3) access memory; (4) send data back to CPU; and (5) write data into register.

The preferred embodiments discussed above have been shown to include a system whereby an annulled instruction does not affect the architected state of a processor, and this aspect may be further shown by way of example given processor 50 of FIG. 10. Specifically, an architected state of a processor is generally known in the art, and by way of example is the state of bits of the items in FIG. 10 including memories 52 and 54, register file A and register file B, as well as a program counter (not explicitly shown) and any special control registers (which may be included in control registers 60). Accordingly, in the preferred embodiment, when an instruction is annulled, it is not permitted to change the bit state or states in any of these items. Still other examples based on device types and configurations will be ascertainable by one skilled in the art.

From the above, it may be appreciated that the present embodiments provide for allowing processor instructions to enter into the processor pipeline, but then act in response to an annul word to prevent selected ones of those instructions from affecting the architected state of the processor. Further, while the present embodiments have been described in detail, various substitutions, modifications or alterations could be made to the descriptions set forth above without departing from the inventive scope. Indeed, various examples to alternative methodologies have been provided above. In addition, as another example, while the preferred implementation and resulting functionality is shown as implemented in system 40, other approaches may be derived by one skilled in the art. As another example, while suppressing operation of an execution unit has been shown as the preferred approach for preventing an instruction from changing the architected state of the processor, other approaches may include suppressing operation of other portions of the processor pipeline so that an instruction which is desired to be annulled is not allowed to alter the architected state of the processor. As yet another example, avoiding branch complexity and improving software pipelining have been shown as two methods wherein the preferred embodiment proves useful, but still others may become apparent to one skilled in the art. Lastly, while the processor of FIG. 10 provides an example of the type of processor where the present circuits, systems, and corresponding functionality may be implemented, numerous other processors could likewise implement the technology taught herein. Given these additional examples, one skilled in the art should further appreciate the inventive scope, which is defined by the following claims.

What is claimed is:

1. A processor having a changeable architected state, comprising:

instruction memory for storing instructions;

an instruction pipeline, wherein an instruction which passes entirely through the pipeline alters the architected state and wherein the pipeline comprises circuitry for fetching instructions from the instruction memory into the pipeline;

an annul word memory for storing an annul code having a plurality of annul bits, each annul bit having a one-to-one correspondence to one instruction of a group of instructions in the pipeline; and circuitry for preventing one or more selected instructions in the group from altering the architected state in response to the corresponding annul bit of the annul code;

wherein the instruction pipeline further comprises a plurality of execution units;

wherein the plurality of execution units are operable such that in a given clock cycle an integer number N of the plurality of execution units are scheduled to execute;

wherein the circuitry for preventing one or more selected instructions in the group from altering the architected state comprises circuitry for coupling annul bits to respective ones of the plurality of execution units; and wherein the circuitry for coupling the annul bits to respective ones of the plurality of execution units comprises circuitry for coupling only the integer number N of the annul bits to the plurality of execution units which are scheduled to execute in the given clock cycle whereby on an immediately following clock cycle annul bits beginning at an N+1 annul bit are coupled to execution units scheduled to execute of that following cycle.

2. The processor of claim 1:

wherein the group of instructions corresponding to the annul code comprise instructions corresponding to a software loop scheduled to execute for an integer M number of iterations; and wherein during a given iteration the circuitry for preventing prevents one or more of the group of instructions corresponding to the annul bits of the annul code from altering the architected state in response to the annul bits of the annul code and the annul code based on a relationship of the given iteration to the integer M number of iterations preventing differing instructions from altering the architected state during different iterations.

3. A processor having a changeable architected state, comprising:

instruction memory for storing instructions;

an instruction pipeline, wherein an instruction which passes entirely through the pipeline alters the architected state and wherein the pipeline comprises circuitry for fetching instructions from the instruction memory into the pipeline;

an annul word memory for storing an annul code having a plurality of annul bits, each annul bit having a one-to-one correspondence to one instruction of a group of instructions in the pipeline; and circuitry for preventing one or more selected instructions in the group from altering the architected state in response to the corresponding annul bit of the annul code;

wherein the annul code is an immediate value in an immediate operand instruction passing through the pipeline loaded into the annul word memory in response to execution of the immediate operand instruction.

4. A processor having a changeable architected state, comprising:

instruction memory for storing instructions;

an instruction pipeline, wherein an instruction which passes entirely through the pipeline alters the architected state and wherein the pipeline comprises circuitry for fetching instructions from the instruction memory into the pipeline;

an annul word memory for storing an annul code having a plurality of annul bits, each annul bit having a one-to-one correspondence to one instruction of a group of instructions in the pipeline; and circuitry for preventing one or more selected instructions in the group from altering the architected state in response to the corresponding annul bit of the annul code;

wherein the annul code is loaded into the annul word memory from a selected location of memory in response to an instruction having a condition predicate;

wherein the annul code comprises a first annul code stored in a first location in the memory loaded into the annul word memory in response to the condition predicate being satisfied; and wherein the annul code comprises a second annul code stored in a second location in the memory loaded into the annul word memory in response to the condition predicate not being satisfied.

5. A processor having a changeable architected state, comprising:

instruction memory for storing instructions;

an instruction pipeline, wherein an instruction which passes entirely through the pipeline alters the architected state and wherein the pipeline comprises circuitry for fetching instructions from the instruction memory into the pipeline;

an annul word memory for storing an annul code having a plurality of annul bits, each annul bit having a one-to-one correspondence to one instruction of a group of instructions in the pipeline; and circuitry for preventing one or more selected instructions in the group from altering the architected state in response to the corresponding annul bit of the annul code;

and further comprising a first data register and a second data register;

wherein the annul code is loaded into the annul word memory from a selected one of the first data register and the second data register in response to an instruction having a condition predicate;

wherein the annul code comprises a first annul code stored in the first data register loaded into the annul word memory in response to the condition predicate being satisfied; and wherein the annul code comprises a second annul code stored in the second data register loaded into the annul word memory in response to the condition predicate not being satisfied.

6. A processor having a changeable architected state, comprising:

instruction memory for storing instructions;

an instruction pipeline, wherein an instruction which passes entirely through the pipeline alters the architected state and wherein the pipeline comprises circuitry for fetching instructions from the instruction memory into the pipeline;

an annul word memory for storing an annul code having a plurality of annul bits, each annul bit having a one-to-one correspondence to one instruction of a group of instructions in the pipeline; and circuitry for preventing one or more selected instructions in the group from altering the architected state in response to the corresponding annul bit of the annul code;

and further comprising a data register;

wherein the annul code is loaded into the annul word memory from a selected half of the data register in response to an instruction having a condition predicate;

wherein the annul code comprises a first annul code stored in a first one-half of the data register loaded into the annul word memory in response to the condition predicate being satisfied; and wherein the annul code comprises a second annul code stored in a second one-half of the data register different from the first one-half loaded into the annul word memory in response to the condition predicate not being satisfied.

7. A processor having a changeable architected state, comprising:

instruction memory for storing instructions;

an instruction pipeline, wherein an instruction which passes entirely through the pipeline alters the architected state and wherein the pipeline comprises circuitry for fetching instructions from the instruction memory into the pipeline;

an annul word memory for storing an annul code having a plurality of annul bits, each annul bit having a one-to-one correspondence to one instruction of a group of instructions in the pipeline; and circuitry for preventing one or more selected instructions in the group from altering the architected state in response to the corresponding annul bit of the annul code;

and further comprising a register;

wherein the register stores the annul code which comprises a set of annul bits having a first logical value and a set of annul bits having a second logical value;

wherein the annul code is loaded into the annul word memory from the register in response to an instruction having a condition predicate;

wherein the circuitry for preventing prevents instructions corresponding to annul bits having a first logical value from altering the architected state in response to the condition predicate being satisfied; and wherein the circuitry for preventing prevents instructions corresponding to annul bits having a second logical value opposite the first logical state from altering the architected state in response to the condition predicate not being satisfied.

8. A method of data processing comprising the steps of:

identifying at compile time prior to execution a group of instructions including a tree of a plurality of conditional branch instructions;

at compile time prior to execution for each conditional branch instruction within the group of instructions forming a first annul code having an annul bit corresponding to each instruction following the conditional branch instruction, the annul bit having a first logical state for instructions following the detected conditional branch instruction executed if a condition of the conditional branch instruction is satisfied and a second logical state opposite to the first logical state for instructions following the detected conditional branch instruction executed if the condition of the conditional branch instruction is not satisfied, forming a second annul code having an annul bit corresponding to each instruction following the conditional branch instruction, the annul bit having the second logical state for instructions following the detected conditional branch instruction executed if a condition of the conditional branch instruction is satisfied and the first logical state for instructions following the detected conditional branch instruction executed if the condition of the conditional branch instruction is not satisfied;

upon execution of the group of instructions detecting each conditional branch instruction, evaluating the condition of the conditional branch instruction, loading the corresponding first annul code if the condition of the conditional branch instruction is satisfied, loading the corresponding second annul code if the condition of the conditional branch instruction is not satisfied, executing each instruction following the conditional branch instruction if the corresponding annul bit of the corresponding annul code has the first state, and not executing each instruction following the conditional branch instruction if the corresponding annul bit of the corresponding annul code has the second state.

* * * * *